(12) United States Patent
Mayer et al.

(10) Patent No.: US 12,517,894 B1
(45) Date of Patent: Jan. 6, 2026

(54) DISTRIBUTED GRAPH ANALYSIS WITH ATOMIC TRANSACTIONS

(71) Applicant: Google LLC, Mountain View, CA (US)

(72) Inventors: Brandon Asher Mayer, Ocala, FL (US); Warren Joseph Schudy, Mount Kisco, NY (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/919,264

(22) Filed: Oct. 17, 2024

(51) Int. Cl.
| | |
|---|---|
| G06F 16/2458 | (2019.01) |
| G06F 3/0482 | (2013.01) |
| G06F 3/04845 | (2022.01) |
| G06F 3/04847 | (2022.01) |
| G06F 16/23 | (2019.01) |
| G06F 16/242 | (2019.01) |
| G06F 16/901 | (2019.01) |

(52) U.S. Cl.
CPC ...... G06F 16/2379 (2019.01); G06F 16/9024 (2019.01)

(58) Field of Classification Search
None
See application file for complete search history.

(56) References Cited

U.S. PATENT DOCUMENTS

| | | | |
|---|---|---|---|
| 7,392,264 B2 * | 6/2008 | Lord | G06F 16/212 |
| 10,409,782 B2 * | 9/2019 | Zhang | G06F 16/9024 |
| 10,430,464 B1 * | 10/2019 | Ravi | G06F 16/9024 |
| 10,977,363 B2 * | 4/2021 | Leitner | G06F 21/554 |
| 11,188,228 B1 * | 11/2021 | Jain | G06F 3/0673 |
| 11,789,922 B1 * | 10/2023 | Jain | G06F 9/466 |
| | | | 707/703 |
| 2023/0131051 A1 * | 4/2023 | Qiao | G06F 9/4881 |
| | | | 707/798 |

OTHER PUBLICATIONS

Ailon et al., "Aggregating Inconsistent Information: Ranking and Clustering", Journal of the Association for Computing Machinery (JACM), vol. 55, Issue 5, Article No. 23, Nov. 5, 2008, 26 pages.
(Continued)

*Primary Examiner* — Debbie M Le
(74) *Attorney, Agent, or Firm* — DORITY & MANNING P.A.

(57) ABSTRACT

A method can include a plurality of iterations. An iteration can include performing, by a computing system comprising one or more computing devices, for each node of a plurality of nodes of a first graph, one or more atomic transactions. An atomic transaction can include retrieving, from one or more distributed data structures that are distributed over a plurality of computing devices, neighbor data indicative of one or more neighbor nodes connected to the node by one or more edges. An atomic transaction can include retrieving, from the one or more distributed data structures based on the neighbor data, cluster data associated with the one or more neighbor nodes. An atomic transaction can include writing, to the one or more distributed data structures based on the neighbor data and the cluster data, cluster assignment data assigning the node to one or more clusters of a plurality of clusters.

20 Claims, 12 Drawing Sheets

(56) References Cited

OTHER PUBLICATIONS

Chawla et al., "Near Optimal LP Rounding Algorithm for Correlation Clustering on Complete and Complete k-partite Graphs", arXiv:1412.0681v3, Jun. 23. 2015, 31 pages.
Shi et al., "Scalable Community Detection via Parallel Correlation Clustering", arXiv:2108.01731v1, Jul. 27, 2021, 13 pages.
Wikipedia.com, "Dataflow Programming", Aug. 10, 2024, https://en.wikipedia.org/wiki/Dataflow_programming, retrieved on Nov. 21, 2024, 6 pages.
Wikipedia.com, "Louvain Method", Nov. 21, 2024, https://en.wikipedia.org/wiki/Louvain_method, retrieved on Nov. 21, 2024, 8 pages.

* cited by examiner

DISTRIBUTED GRAPH ANALYSIS WITH ATOMIC TRANSACTIONS

FIELD

The present disclosure relates generally to distributed computing processes and distributed computing devices and systems. More particularly, the present disclosure relates to systems and methods for distributed graph analysis using atomic data transactions.

BACKGROUND

Graphs are data structures that can be used to represent and analyze various kinds of data for various applications, such as fraud detection, intelligence, money laundering detection, epidemiology, analysis of social networks (e.g., business networks, knowledge networks, social media networks, etc.), detection of coordinated deceptive practices (e.g., in social media networks), business operations analysis (e.g., supply chain analysis, information technology management, etc.), and other applications. A graph can include a plurality of nodes and one or more edges, with each edge connecting two or more nodes of the plurality of nodes.

Some graphs, such as graphs representing interactions on a social media network, may comprise a large number of nodes or edges, such as billions of nodes or trillions of edges. Some graphs may require large amounts of space to store, such as multiple terabytes per graph. Analyzing large graphs can pose a variety of technical challenges, such as high computing costs (e.g., electricity cost, memory usage, processor usage, etc.), time constraints (e.g., latency constraints, throughput constraints, etc.), and other challenges.

SUMMARY

Aspects and advantages of embodiments of the present disclosure will be set forth in part in the following description, or can be learned from the description, or can be learned through practice of the embodiments.

Example aspects of the present disclosure provide an example method. In some implementations, the example method can include a plurality of iterations. In the example method, each of the plurality of iterations can include performing, by a computing system comprising one or more computing devices, for each node of a plurality of nodes of a first graph, one or more atomic transactions. In the example method, each of the one or more atomic transactions can include retrieving, from one or more distributed data structures that are distributed over a plurality of computing devices, neighbor data indicative of one or more neighbor nodes that are connected to the node by one or more edges of the first graph. In the example method, each of the one or more atomic transactions can include retrieving, from the one or more distributed data structures based on the neighbor data, cluster data indicative of one or more clusters associated with the one or more neighbor nodes. In the example method, each of the one or more atomic transactions can include writing, to the one or more distributed data structures based on the neighbor data and the cluster data, cluster assignment data assigning the node to at least one cluster.

In the example method, the one or more distributed data structures can be stored in a distributed volatile memory system distributed in volatile memory of the plurality of computing devices.

In the example method, the one or more atomic transactions can include one or more atomic remote direct memory access transactions.

In the example method, the computing system can include a plurality of worker computing devices operating in parallel. In the example method, each worker computing device of the plurality of worker computing devices can perform at least one atomic transaction for at least one node of the plurality of nodes.

In the example method, the computing system can further include one or more controller computing devices. The example method can further include receiving, by a first worker computing device from the one or more controller computing devices, node assignment data indicative of a first node assigned to the first worker computing device. The example method can further include performing, by the first worker computing device responsive to receiving the node assignment data, a first atomic transaction on the first node assigned to the first worker computing device.

The example method can further include receiving, by the one or more controller computing devices, data indicative of data loss during one or more iterations of the plurality of iterations. The example method can further include assigning, by the one or more controller computing devices based on the data indicative of the data loss, one or more repeat work assignments associated with the one or more iterations.

In the example method, the one or more atomic transactions can include a plurality of read or write operations performed by a first worker computing device on a first plurality of data regions. In the example method, wherein the one or more atomic transactions can be configured to prevent the first worker computing device from writing data if any region of the first plurality of data regions has been written to by a second worker computing device during the atomic transaction In the example method, the one or more distributed data structures can include a plurality of fixed-size data blocks. In the example method, each data region of the first plurality of data regions can include one or more fixed-size data blocks of the plurality of fixed-size data blocks.

In the example method, the cluster assignment data can be determined based on one or more modularity values.

In the example method, determining the cluster assignment data can include obtaining, for each cluster of a plurality of clusters, a first modularity value for the cluster with the node included in the cluster. In the example method, determining the cluster assignment data can include obtaining, for each cluster of the plurality of clusters, a second modularity value for the cluster with the node excluded from the cluster. In the example method, determining the cluster assignment data can include selecting, based on one or more comparisons between first modularity values and second modularity values, a cluster assignment for the node.

In the example method, writing the cluster assignment data can include writing, to a distributed data structure storing node data, a cluster identifier to a data record associated with the node. In the example method, writing the cluster assignment data can include, if the at least one cluster comprises two or more nodes including the node, writing cluster data associated with the at least one cluster to a distributed data structure storing cluster data, the cluster data comprising size data indicative of a number of nodes in the cluster and edge data indicative of one or more edges from the cluster to one or more nodes or other clusters. In the example method, the cluster identifier can be a specially designated identifier for singleton clusters if the at least one cluster consists of only the node.

In the example method, each of the plurality of iterations can further include writing, by the computing system subsequent to performing an atomic transaction for each of the one or more nodes, to the one or more distributed data structures, data indicative of an updated graph. In the example method, the updated graph can include at least one of: a collapsed graph, wherein each node of the collapsed graph corresponds to a cluster of the first graph; and an expanded graph, wherein each cluster of the expanded graph corresponds to a node of the first graph.

In the example method, the plurality of iterations can include a first plurality of iterations wherein the updated graph comprises a collapsed graph. In the example method, the plurality of iterations can include a second, subsequent plurality of iterations wherein the updated graph comprises an expanded graph.

In the example method, each of the plurality of iterations can include performing, for each node, a plurality of atomic transactions.

In the example method, the cluster data can include data indicative of a plurality of edges connected to member nodes of the one or more clusters.

In the example method, the one or more distributed data structures can include a plurality of copies of the neighbor data, cluster data, and node assignment data. In the example method, writing the cluster assignment data can include writing, to a plurality of data locations associated with the plurality of copies, the cluster assignment data.

Example aspects of the present disclosure provide one or more example non-transitory computer-readable media storing instructions that are executable by one or more processors to cause a computing system to perform example operations. In some implementations, the example operations can include a plurality of iterations. In some implementations, each of the plurality of iterations can include performing, for each node of a plurality of nodes of a first graph, one or more atomic transactions. In some implementations, each of the one or more atomic transactions can include retrieving, from one or more distributed data structures that are distributed over a plurality of computing devices, neighbor data indicative of one or more neighbor nodes that are connected to the node by one or more edges of the first graph. In some implementations, each of the one or more atomic transactions can include retrieving, from the one or more distributed data structures based on the neighbor data, cluster data indicative of one or more clusters associated with the one or more neighbor nodes. In some implementations, each of the one or more atomic transactions can include writing, to the one or more distributed data structures based on the neighbor data and the cluster data, cluster assignment data assigning the node to at least one cluster.

In the example computing system, the one or more atomic transactions can include one or more atomic remote direct memory access transactions.

The computing system can include a plurality of worker computing devices operating in parallel. In the example operations, each worker computing device of the plurality of worker computing devices can perform at least one atomic transaction for at least one node of the plurality of nodes.

Example aspects of the present disclosure provide an example computing system that includes one or more processors and one or more example non-transitory computer-readable media storing instructions that are executable by one or more processors to cause a computing system to perform example operations. In some implementations, the example operations can include a plurality of iterations. In some implementations, each of the plurality of iterations can include performing, for each node of a plurality of nodes of a first graph, one or more atomic transactions. In some implementations, each of the one or more atomic transactions can include retrieving, from one or more distributed data structures that are distributed over a plurality of computing devices, neighbor data indicative of one or more neighbor nodes that are connected to the node by one or more edges of the first graph. In some implementations, each of the one or more atomic transactions can include retrieving, from the one or more distributed data structures based on the neighbor data, cluster data indicative of one or more clusters associated with the one or more neighbor nodes. In some implementations, each of the one or more atomic transactions can include writing, to the one or more distributed data structures based on the neighbor data and the cluster data, cluster assignment data assigning the node to at least one cluster.

Other example aspects of the present disclosure are directed to other systems, methods, apparatuses, tangible non-transitory computer-readable media, and devices for performing functions described herein. These and other features, aspects, and advantages of various implementations will become better understood with reference to the following description and appended claims. The accompanying drawings, which are incorporated in and constitute a part of this specification, illustrate implementations of the present disclosure and, together with the description, help explain the related principles.

DETAILED DESCRIPTION

Figure 1:
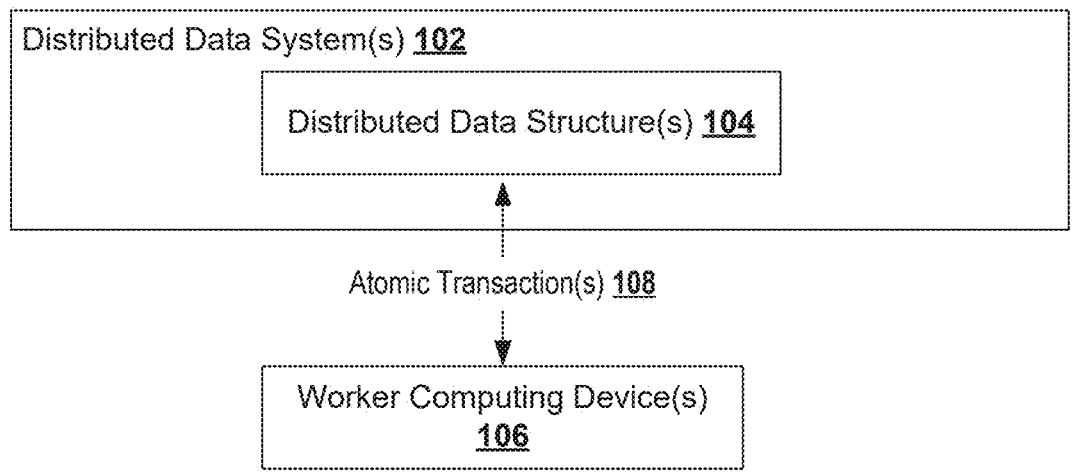
FIG. 1 is a block diagram of an example system for performing distributed analysis using atomic transactions according to example implementations of some aspects of the present disclosure.

Generally, the present disclosure is directed to systems and methods for distributed graph analysis using atomic transactions. A graph can be stored in a distributed data structure distributed across a plurality of computing devices, wherein each computing device stores a portion of the distributed data structure. A graph analysis workflow can be split into a plurality of individual analysis steps, and each analysis step can be performed by one of a plurality of computing devices. An analysis step can include, for example, retrieving graph data from one or more distributed data structures; analyzing the retrieved data; and writing analysis data to the one or more distributed data structures based on the analysis. In some instances, each analysis step can be an atomic (e.g., indivisible, irreducible, etc.) transaction comprising a plurality of operations, wherein none of the write operations will be performed unless all of the operations can be performed together without causing a data conflict in the distributed data structure.

In some instances, a distributed data structure can include a distributed memory data structure stored in memory (e.g., random access memory (RAM), flash memory, etc.) of a plurality of computing devices. In some instances, retrieving from and writing to the data structure can include remote direct memory access (RDMA), wherein a first computing device can access (e.g., read from, write to, etc.) the memory of a second computing device without involving either computing device's operating system. In some instances, an atomic transaction can include a remote direct memory access transaction conforming to the principles of atomicity, consistency, isolation, and durability (ACID). In some instances, a plurality of duplicate distributed data structures can be used in parallel to prevent or reduce data loss (e.g., due to unavailability of individual computing devices storing portions of the distributed data structure).

In some instances, an atomic transaction can include a transaction conforming to one or more ACID principles to prevent data conflicts from simultaneous data access by multiple computing devices. In some instances, an atomic transaction can include one or more access control mechanisms (e.g., locks, mutexes, etc.) or consistency check mechanisms to ensure conformity to the ACID principles. For example, in some instances, an atomic transaction can include implementing an access control (e.g., lock, read-only access restriction, etc.) on one or more data regions before reading from the data region(s); generating analysis data based on data retrieved from the data region(s); implementing an access control on one or more second data regions to be written to; writing data to the second data region(s); and subsequently releasing one or more access controls. As another example, in some instances, an atomic transaction can include retrieving, by a first computing device, data from one or more first data locations; generating, by the first computing device, analysis data to be written to one or more second data locations of within the distributed data structures; and determining, after the analysis data is generated, whether to write the analysis data to the one or more second locations. Such a determination can be based, for instance, on whether another computing device has written to any of the first data locations or second data locations since the atomic transaction began.

In some instances, a plurality of devices for performing distributed graph analysis can include one or more controller devices and a plurality of worker devices, which can be the same as or different from a plurality of devices storing the distributed data structure. In some instances, a controller device can coordinate the efforts of the worker devices, such as by assigning one or more nodes or other graph components to each worker device, which can perform one or more atomic transactions associated with the assigned node. In some instances, the controller device can assign nodes based on a data structure tracking which nodes have been successfully analyzed so far (or how many times each node has been successfully analyzed). If an atomic transaction fails (e.g., terminates without writing) due to a data conflict, the controller device can re-assign the node to another worker device until the node is successfully analyzed and an atomic transaction succeeds in writing updated analysis data to the distributed data structure.

In some instances, a distributed data structure can include various data structures, such as a database structure (e.g., key-value structure), a flat data structure (e.g., file-like or memory-like data structure comprising a plurality of fixed-size data blocks indexed by data address, etc.), or other data structure. In some instances, a flat data structure may provide reduced computational cost (e.g., memory cost, central processing unit (CPU) usage, etc.) compared to a key-value store, while a key-value store may in some instances provide other benefits compared to a flat data structure (e.g., simplified coding, flexible data block sizes, etc.). In some instances, an atomic transaction conforming to one or more ACID principles can be performed on a flat data structure. For example, a computing device can implement one or more access controls, consistency checks, or other mechanisms to one or more fixed-size data blocks of a flat data structure to ensure conformity to the one or more ACID principles.

In some instances, systems and methods of the present disclosure can be applied to a variety of graph analysis problems. Example applications can include graph partitioning (e.g., clustering, etc.), wherein nodes of a graph are assigned to one or more groups (e.g., clusters, partitions, etc.) of nodes based on one or more grouping criteria; matching (e.g., maximum-weight matching, etc.), wherein edges of a graph are assigned to one or more groups of edges based on one or more grouping criteria (e.g., weight, etc.); or other graph analysis applications. In some instances, graph partitioning can include correlation clustering, wherein nodes are assigned to groups based on a modularity metric. A modularity metric can include, for example, a measure of the density of connections between nodes within a cluster in comparison to one or more other values, such as a density of between-cluster connections, a size of the cluster, an expected density of within-cluster connections (e.g., according to a random edge distribution, etc.), or other value.

In some instances, a distributed graph analysis can include one or more heuristic optimizations, such as a greedy heuristic optimization comprising a plurality of local optimizations. In some instances, a distributed graph analysis can include, for each of a plurality of iterations, performing an atomic transaction on each node, edge, or other component of a graph. Each atomic transaction can include, for example, a local optimization associated with a single node, edge, or other component of the graph. For example, in some instances, a local optimization can include determining, for each of a plurality of grouping options for a node or edge, a value for a grouping criterion (e.g., modularity value, weight value for maximum-weight matching, balance metric for balanced partitioning, etc.), and assigning the node or edge to a group associated with the highest value. In some instances, a plurality of local optimizations can be performed for each node.

In some instances, a distributed graph analysis can include hierarchically collapsing or expanding one or more groups of the graph, and performing a plurality of local optimizations on the collapsed or expanded graph. For example, in some instances, a distributed graph analysis can include, for each of a first plurality of iterations: performing a local optimization on each node of a first graph, wherein the local optimization comprises grouping one or more nodes into clusters; and subsequently collapsing each group to generate a collapsed graph, wherein each group of the first graph is a node of the collapsed graph. For example, in some instances, each within-group edge of the first graph can be absent from the collapsed graph, and a plurality of between-group edges can be combined into a single weighted edge having a weight equal to a sum of weights of the corresponding between-group edges of the first graph. In some instances, a distributed graph analysis can further include, for each of a second plurality of iterations: performing a local optimization on each node of a collapsed graph, wherein the local optimization comprises grouping one or more nodes into clusters; and subsequently expanding each node of the collapsed graph to generate an expanded graph, wherein a group of the expanded graph can correspond to a node of the collapsed graph. In some instances, the number of first and second iterations can be selected as a hyperparameter of a distributed graph analysis method.

In some instances, the distributed data structures can include a plurality of distributed data structures, such as a first distributed data structure for storing node data; a second distributed data structure for storing group data; or other distributed data structures. In some instances, a distributed node data structure can include, for each node of a graph, one or more of a node identifier (e.g., numerical identifier), edge data, neighbor data, edge weight data, or the like. In some instances, a distributed group data structure can include, for each group of a grouping (e.g., partition, matching, etc.), one or more of a group identifier, group size data, group member data, edge data, edge weight data, or the like.

Systems and methods according to some aspects of the present disclosure can provide a variety of technical effects and benefits, such as improvements to computing technology (e.g., distributed graph analysis technology, remote direct memory access technology, atomic transaction technology, etc.). For example, in some instances, systems and methods according to some aspects of the present disclosure can provide reduced latency, increased throughput, or other performance improvements in distributed graph analysis compared to some alternative implementations. In some instances, systems and methods according to some aspects of the present disclosure can provide improved optimization outcomes in distributed graph optimization compared to some alternative implementations. In some instances, systems and methods according to some aspects of the present disclosure can provide improved data consistency compared to some alternative implementations. In some instances, systems and methods according to some aspects of the present disclosure can provide reduced computational cost (e.g., electricity cost, memory usage, processor usage, etc.) compared to some alternative implementations.

For example, in some instances, systems and methods according to some aspects of the present disclosure can provide improved data consistency compared to some alternative implementations. For example, in some instances, atomic transactions of the present disclosure can prevent various kinds of data conflicts, therefore providing improved data consistency compared to some alternative implementations (e.g., implementations comprising distributed computing without atomic transactions, etc.).

In some instances, systems and methods according to some aspects of the present disclosure can provide improved optimization outcomes in distributed graph optimization compared to some alternative implementations. For example, in some instances, a data conflict associated with some alternative implementations may cause a node or edge to be assigned to a group that is not locally optimal. Advantageously, systems and methods according to some aspects of the present disclosure can provide improved data consistency compared to some alternative methods, thereby providing improved optimization outcomes in some instances.

In some instances, systems and methods according to some aspects of the present disclosure can provide reduced latency in distributed graph analysis compared to some alternative implementations. For example, in some instances, systems and methods according to some aspects of the present disclosure can facilitate a greater degree of parallelism compared to some alternative methods, thereby enabling reduced latency, increased throughput, reduced analysis time (e.g., wall-clock time), or other benefits compared to some alternative implementations. For example, in some instances, an alternative implementation without atomic transactions may face one or more data collision risks or data consistency risks. In some instances, an alternative plan to manage such a risk can include limiting a number of nodes that are simultaneously processed to keep an expected collision rate under a threshold level (e.g., associated with a desired precision or other optimization goal, etc.). Advantageously, systems and methods according to aspects of the present disclosure can provide data consistency without limiting parallelism, thereby providing greater parallelism and reduced latency compared to some alternative implementations.

In some instances, example systems and methods can provide reduced latency compared to some alternative implementations in other ways. For example, in some instances, systems and methods according to some aspects of the present disclosure can access (e.g., retrieve from, write to, etc.) a distributed data structure stored in low-latency volatile memory (e.g., RAM) of a plurality of computing devices, which can provide reduced memory latency compared to some alternative implementations (e.g., some implementations without remote direct memory access, etc.). For example, some graphs (e.g., multi-terabyte graphs, etc.) may be too large to fit into the RAM of a single computing device, while some alternative implementations involving multiple storage devices may require significant communication overhead to perform data operations (e.g., atomic data transactions) on a graph stored in a distributed manner across multiple devices. Advantageously, systems and methods according to some aspects of the present disclosure can use atomic transactions to access a remote direct memory access data structure, thereby reducing latency compared to some alternative implementations (e.g., some alternative implementations without atomic transactions, without remote direct memory access, etc.).

In some instances, systems and methods according to some aspects of the present disclosure can provide reduced computational cost (e.g., electricity cost, memory usage, processor usage, etc.) compared to some alternative implementations. For example, in some instances, example systems and methods may enable reduced parallelism overhead (e.g., communication overhead) compared to some alternative implementations, such as alternative implementations that may include performing one or more computational steps (e.g., communication steps, data retrieval steps, etc.) to manage a collision risk or data consistency risk associated with distributed graph analysis.

As another example, systems and methods that can be used to perform distributed graph analysis at reduced latency for a given computational cost can in some instances be adapted to provide reduced computational cost for a given latency (e.g., latency target, maximum latency threshold, etc.). For example, in some instances, a task that can be performed in less time than an alternate task using a given set of hardware can in some instances be adapted to be performed in a similar (e.g., same) amount of time as the alternative task using less hardware (e.g., fewer memory devices, fewer processor devices, etc.) or lower-performance hardware. Additionally, in some instances, lower-performance hardware or reduced hardware usage may be associated with a reduced computational cost (e.g., manufacturing cost, energy cost of operation, etc.) compared to more hardware or higher-performance hardware. Thus, it will be appreciated that systems and methods of the present disclosure can in some instances reduce a cost (e.g., an energy cost) of performing graph analysis compared to some alternative implementations.

Various example implementations are described herein with respect to the accompanying Figures.

FIG. 1 is a block diagram of an example system for performing distributed analysis using atomic transactions according to example implementations of some aspects of the present disclosure. A worker computing device 106 can access one or more distributed data structures 104 in a distributed data system 102 via one or more atomic transactions 108. Each atomic transaction 108 can include, for example, retrieving data (e.g., graph data such as node data, edge data, grouping data, etc.) from the distributed data structures 104; analyzing the retrieved data; and writing analysis data (e.g., updated grouping data, etc.) to the distributed data structures 104.

A distributed data system 102 can be or include one or more software, firmware, or hardware components configured to store, retrieve, read, receive, or otherwise process data to be stored (e.g., permanently or temporarily) in the distributed data system 102. In some instances, the distributed data system 102 can be, comprise, be comprised by, or share one or more properties with a computing device or system described below with respect to FIGS. 9-11 (e.g., server computing system 60, model development platform system 70, computing device 98, computing device 99, etc.). For example, in some instances, a distributed data system 102 can include a plurality of computing devices (e.g., server computing system(s) 60) or components thereof (e.g., memory 62 components, etc.) described below with respect to FIGS. 9-11.

In some instances, a distributed data system 102 can include a system that stores data (e.g., distributed data structures 104) in volatile memory (e.g., random access memory (RAM)) or other high-speed or low-latency memory (e.g., flash memory, etc.). In some instances, a distributed data system 102 can include a system that supports remote direct memory access. Remote direct memory access (RDMA) can include, for example, one or more techniques allowing a first computing device (e.g., worker computing device 106, etc.) to access the memory of a second computing device (e.g., computing device associated with the distributed data system 102, etc.) directly, such as without the need for an intervening system (e.g., operating system, etc.) to handle the data transfer. For example, in some instances, an access device of a first computing device, such as a network interface card (NIC), can access the memory of a second device directly, bypassing the operating system and CPU of the second system. For example, in some instances, an interface (e.g., RDMA-capable NIC, etc.) can provide a direct connection between memory of a first device and memory of a second device, allowing data to be transferred directly into memory of the second device (e.g., worker computing device 106, etc.), without a need for intermediate processing. This can in some instances significantly improve the performance (e.g., latency, etc.) of data transfers, as it can eliminate communication overhead associated with some alternative data transfer methods, such as transmission control protocol/internet protocol (TCP/IP) methods. However, in some instances, distributed data systems 102 without remote direct memory access (e.g., Redis, etc.) can be used without deviating from the scope of the present disclosure.

In some instances, a distributed data system 102 can include a system that supports atomic transactions 108 associated with one or more distributed data structures 104 stored in the distributed data system. For example, in some instances, a distributed data system 102 can include a data system that supports atomic transactions 108 comprising a plurality of data read and write operations associated with one distributed data structure 104 or multiple distributed data structures 104; one data region or multiple data regions of one or more distributed data structures 104; data stored on one computing device or multiple separate computing devices; or other combination of operations or data locations. In some instances, a distributed data system 102 can include a remote direct memory access system supporting atomic transactions 108. In some instances, a distributed data system 102 can include a remote direct memory access system supporting atomic transactions 108 comprising a plurality of read or write operations associated with data stored on a plurality of computing devices of the distributed data system 102.

A distributed data structure 104 can include, for example, any data structure (e.g., file, memory page, data block, database, data table, data row, object of a NoSQL database, object of an object-oriented programming language, struct, etc.) configured to store data to be processed by one or more worker devices 106 in one or more atomic transactions 108. For example, in some instances, a distributed data structure 104 can include a key-value store or other key-value-structured data structure 104. As another example, in some instances, a distributed data structure 104 can include a data structure having a "flat" structure (e.g., file-like or memory-page-like data structure, etc.), wherein a plurality of data blocks (e.g., fixed-size data blocks, etc.) are accessed based on a data location (e.g., memory address, file block index, etc.) associated with the data.

In some instances, a distributed data structure 104 can be stored across a plurality of computing devices in "stripes," such that consecutive memory locations may be stored on separate devices (e.g., memory devices, computing devices, etc.). As a simplified illustrative example, a distributed data structure 104 stored across two computing devices can be separated into a sequence of four consecutive "stripes" (e.g., of equal size, etc.); the sequentially first stripe in the sequence can be stored on the first device; the sequentially second stripe can be stored on the second device; the sequentially third stripe can be stored on the first device; and the sequentially fourth stripe can be stored on the second device. In some instances, a single stripe can comprise a plurality of substripes (e.g., stored on a single device), such as a fixed-size data block of predetermined size. A substripe can have a size that is correlated or uncorrelated with an amount of memory required to store an individual data item (e.g., data indicative of an individual graph node, edge, or cluster, etc.). For example, in some instances, a substripe size can be equal to a positive integer (e.g., one, etc.) times an amount of memory required to store an individual data item. In some instances, a larger substripe size can provide reduced memory usage compared to a smaller integer (e.g., due to reduced metadata requirements), while a smaller substripe size can in some instances provide other benefits, such as simplified coding requirements. In some instances, a distributed data structure 104 can have a size that is equal to or greater than an amount of memory required to store all data items (e.g., graph nodes, etc.) to be included in the distributed data structure 104, such as $1+\varepsilon$ times the amount of memory, wherein $\varepsilon$ can be a positive number (e.g., 0.1, 1.0, etc.) to provide for convenient reuse of certain data (e.g., in a hierarchical graph analysis process, etc.).

In some instances, a distributed data structure 104 can be a data structure stored in volatile memory (e.g., RAM) of a distributed data system 102, such as in RAM that is directly accessible via RDMA. For example, in some instances, a distributed data structure 104 can be stored across a plurality of computing devices or memory or storage devices, wherein each device of the plurality can store a strict subset of the distributed data structure 104. In some instances, a distributed data structure 104 can include a plurality of duplicate copies of data (e.g., distributed over a plurality of pluralities of computing devices, etc.). Equivalently, a distributed data system 102 can store a plurality of duplicate distributed data structures 104.

In some instances, a distributed data structure 104 can include graph data describing one or more graphs or other graph-structured data (e.g., social network data, epidemiology data, logistics data, etc.). Graph-structured data can include, for example, data comprising first data indicative of a plurality of first items (e.g., vertices, nodes, entities, etc.) and data comprising second data indicative of one or more relationships (e.g., directed or undirected edges, connections, relationships, etc.) between sets (e.g., pairs, tuples, groups, pluralities, etc.) of the first items. Further details of an example system comprising a distributed data structure 104 comprising graph data are described below with respect to FIG. 2.

In some instances, a distributed data structure 104 can be initialized at one or more times, such as at the start of an overall analysis process (e.g., graph analysis process); at the start of one or more iterations or other subprocesses of an overall analysis process; or at another time. For example, in some instances, a distributed data structure 104 can be initialized by retrieving first data from non-volatile memory of one or more devices (e.g., distributed data systems 102, computing devices or memory devices described below with respect to FIGS. 9-11, etc.) and writing, based on the retrieved first data, second data to an RDMA-accessible data structure of a distributed data system 102. In some instances, a distributed data structure 104 can be completely initialized before an analysis process or subprocess begins, or can be initialized in stages (e.g., during an analysis process). In some instances, an initialization process can include a distributed initialization process, wherein a plurality of computing devices (e.g., worker computing devices 106, computing devices of a distributed data system 102, etc.) can each process one or more subsets (e.g., graph nodes or groups of nodes, etc.) of a distributed data structure 104. In some instances, initializing a subset (e.g., graph node, etc.) of a distributed data structure 104 can include checking whether an initialization process has already been performed for the subset, and performing the initialization process if it has not already been performed.

A worker computing device 106 can be or include one or more software, firmware, or hardware components configured to perform atomic transaction(s) 108. In some instances, the worker computing device 106 can be, comprise, be comprised by, or otherwise share one or more properties with a computing device or system described below with respect to FIGS. 18-20 (e.g., server computing system 60, model development platform system 70, computing device 98, computing device 99, etc.). In some instances, a plurality of worker computing devices 106 can operate in parallel, together performing a plurality of simultaneous or otherwise overlapping (i.e., overlapping in time) atomic transactions 108. Further details of some example operations performed by some example worker computing devices 106 are described below with respect to FIG. 3.

An atomic transaction 108 can include, for example, a sequence of related data operations, the sequence configured to conform to one or more of the principles of atomicity, consistency, isolation, durability (ACID principles). Atomicity can include, for example, a property wherein a plurality of transactions are treated as a single "unit," such that the transaction is either completely performed according to one or more requirements (e.g., successfully performed, performed uninterrupted, performed without data conflict, etc.) or, if it cannot be completely performed, terminates in a manner that does not modify the contents of a distributed data structure 104 (e.g., does not write, edit, etc.). Terminating in a manner that does not modify the contents of a distributed data structure 104 can include, for example, terminating without performing any write or edit operations; rolling back any write or edit operations performed in a manner that ensures data consistency; or otherwise terminating in such a manner that a state of the distributed data structure 104 is equivalent to a state in which performance of the atomic transaction 108 has never begun. As used herein, the term "atomic" transaction can refer to a transaction having the property of atomicity (e.g., irrespective of whether the atomic transaction satisfies one or more other ACID properties, such as durability).

In some instances, a distributed data system 102 can be configured to ensure one or more ACID properties (e.g., atomicity, consistency, isolation, etc.) of an atomic transaction 108 in any appropriate manner. For example, in some instances, a distributed data system 102 can use one or more data access controls (e.g., locks, mutexes, etc.) to prevent operations that may conflict with the one or more ACID properties. As another example, a distributed data system 102 can use one or more consistency checking operations to prevent operations that may conflict with the one or more ACID properties. For example, in some instances, an atomic transaction 108 can include one or more read operations (e.g., uncontrolled or controlled read operations) and one or more controlled write operations. In some instances, one or more access controls can prevent a worker computing device 106 from writing new data if such a write would conflict with the one or more ACID properties. For example, in some instances, an access control can prevent a worker computing device 106 from writing data in an atomic transaction 108 if any data retrieved or relied on during the atomic transaction 108 has been rewritten by a second worker computing device 106 during the time of the atomic transaction 108. Example means for preventing such writing can include, for example, locking the data regions to be read before performance of an atomic transaction 108 begins, such that other worker computing devices 106 cannot write to the data region after the data regions are read unless the first worker computing device 106 releases the lock (e.g., after completing the atomic transaction 108). Other implementations are possible. Similarly, in some instances, an access control can prevent a worker computing device 106 from writing data in an atomic transaction 108 if any data region to be written to during the atomic transaction 108 has been rewritten by a second worker computing device 106 during the time of the atomic transaction 108; if any region has been locked or otherwise access controlled; or in any other circumstances that may create a data conflict or violate one or more ACID principles.

In some instances, an atomic transaction 108 can be performed on various types of data structures, such as key-value-structured data accessed or indexed by key, relational database data accessed or indexed by key or data column, flat-structured (e.g., file-like, memory-like, etc.) data comprising data regions accessed or indexed by location (e.g., memory address, data region location, data stripe or substripe location, etc.), or other data structure type. In some instances, providing one or more ACID properties for a flat-structured distributed data structure 104 can include applying one or more access controls (e.g., locks, mutexes) or performing one or more conditional operations (e.g., writing conditioned on a consistency check or access control, etc.) based at least in part on one or more data locations (e.g., memory addresses, data stripe or substripe location, etc.) associated with an atomic transaction 108.

Consistency can include, for example, a property wherein an atomic transaction 108 is incapable of transitioning a distributed data structure 104 from a valid state (e.g., logically consistent state, state that satisfies one or more constraints such as design constraints or logical constraints, etc.) to an invalid state. As a non-limiting illustrative example, consistency can include ensuring that an atomic transaction 108 cannot modify one or more invariant properties, such as one or more total values (e.g., total number or total weight of nodes or edges in a graph, total number or total weight of edges connected to a particular node, etc.), one or more identity values (e.g., correlations between node identifiers, edge identifiers, or group identifiers and nodes, edges, or groups being identified, etc.), or other constraints.

Isolation can include, for example, a property wherein a plurality of atomic transactions 108 can be performed concurrently, and an outcome of the concurrent execution of a plurality of atomic transactions 108 is identical to an outcome of performing the same plurality of atomic transactions 108 in sequence. In some instances, an isolation property can be satisfied if any sequential order of operations exists that would create a result equivalent to a result of a plurality of concurrent atomic transactions 108.

Durability can include, for example, a property wherein an atomic transaction 108 that has been performed can durably (e.g., permanently, etc.) affect the state of a distributed data structure 104, even in the event of a subsequent system failure or error (e.g., power outage, system crash, etc.). Example methods for providing durability (e.g., in a RAM-based or RDMA-based distributed data system 102) can include providing duplicate copies of a distributed data structure 104 or data stored therein; providing non-volatile backup storage, such as using a system that automatically commits each atomic transaction 108 to a data structure stored in one or more non-volatile computer-readable storage media; or other method.

In some instances, a plurality of data operations of an atomic transaction 108 can include one or more retrieval operations, wherein a worker computing device 106 retrieves, from the distributed data structure 104, data indicative of one or more input values (e.g., graph data values, etc.); one or more analysis operations, wherein the worker computing device 106 analyzes the one or more input values to generate one or more analysis data values (e.g., group assignment value associated with a graph analysis, etc.); and one or more data write operations, wherein the worker computing device 106 writes the one or more analysis data values to the distributed data structure 104. In some instances, the plurality of data operations can be performed in a manner that ensures one or more of atomicity, consistency, isolation, and durability of the atomic transaction.

Figure 2:
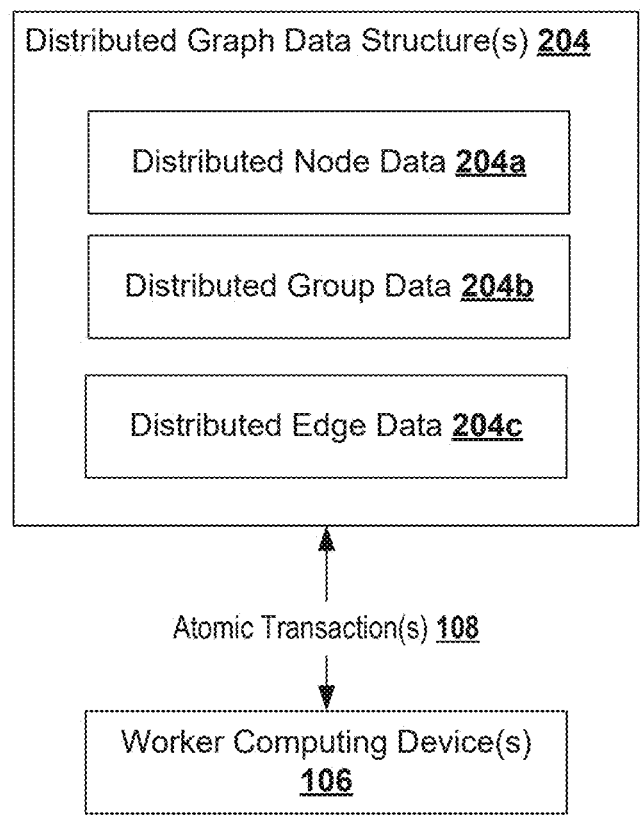
FIG. 2 is a block diagram of an example system for performing distributed graph analysis using atomic transactions according to example implementations of some aspects of the present disclosure.

FIG. 2 is a block diagram of an example system for performing distributed graph analysis using atomic transactions according to example implementations of some aspects of the present disclosure. A worker computing device 106 can access one or more distributed graph data structures 204 via one or more atomic transactions 108. The distributed graph data structures 204 can include, for example, one or more distributed node data structures 204a, distributed group data structures 204b, distributed edge data structures 204c, or other graph data structures.

A distributed graph data structure 204 can be, comprise, be comprised by, or otherwise share one or more properties with a distributed data structure 104. For example, in some instances, a distributed graph data structure 204, 204a, 204b, or 204c can have any property described above with respect to a distributed data structure 104, or vice versa.

A distributed node data structure 204a can include, for example, a plurality of data entries, with each data entry comprising data associated with one or more nodes (e.g., vertices, etc.) of a graph associated with the distributed node data structure 204a. In some instances, a data entry of a distributed node data structure 204a can include node identifier data (e.g., numerical identifier), edge data (e.g., edge weight; node identifier or other node data of nodes connected to the edge; edge direction, type, or other attribute; etc.) of one or more edges connected to a node associated with the data entry; neighbor data (e.g., node identifier data, etc.) of one or more nodes connected to the node associated with the data entry by the one or more edges; group data (e.g., cluster data, partition data) associated with one or more groups to which the node is currently (e.g., temporarily, permanently, etc.) assigned; or other data.

A distributed group data structure 204b can include, for example, a plurality of data entries, with each data entry comprising data associated with one or more groups (e.g., clusters, partitions, etc.) of components (e.g., nodes, edges, etc.) of a graph associated with the distributed group data structure 204b. In some instances, a data entry of a distributed group data structure 204b can include group identifier data (e.g., numerical identifier), edge data (e.g., edge weight; node identifier, group identifier, or other data of entities connected to the edge; edge direction, type, or other attribute; etc.) of one or more edges connected to a group associated with the data entry; neighbor data (e.g., identifier data, etc.) of one or more groups or nodes connected to the group associated with the data entry by the one or more edges; member data (e.g., node identifier, member count or group size data, etc.) associated with one or more nodes that are currently (e.g., temporarily, permanently, etc.) assigned to the group; or other data.

A distributed edge data structure 204c can include, for example, a plurality of data entries, with each data entry comprising data associated with one or more edges of a graph associated with the distributed edge data structure 204c. In some instances, a data entry of a distributed edge data structure 204c can include edge identifier data (e.g., numerical identifier); edge weight data; neighbor data (e.g., node identifier, cluster identifier, or other data) of entities connected to the edge; edge direction or type; or other edge data.

In some instances, edge data of a distributed graph data structure 204 can include edge weight data. In some instances, edge weight data can include a raw weight value or an offset edge weight value comprising a sum of a raw weight and a weight offset. In some instances, offset values can be initialized during an initialization process of a distributed graph data structure 204 (e.g., at the beginning of an overall graph analysis process, at the beginning of an iteration of a graph analysis process, etc.). In some instances, other initialization steps can be performed, such as allocating an amount of space in the distributed data system 102 to store a distributed graph data structure 204 of a particular size (e.g., $(1+\varepsilon)n$ times an amount of memory required to store one data entry, where n is a number of nodes or other entities of a graph); initializing one or more values of the distributed graph data structure 204 (e.g., by retrieving the values from another data source, such as a non-volatile storage system, distributed processing system such as MapReduce, Flume, Dataflow, etc.); computing one or more initial values (e.g., computing cluster size from raw member data, etc.); or other initialization operation.

Figure 3:
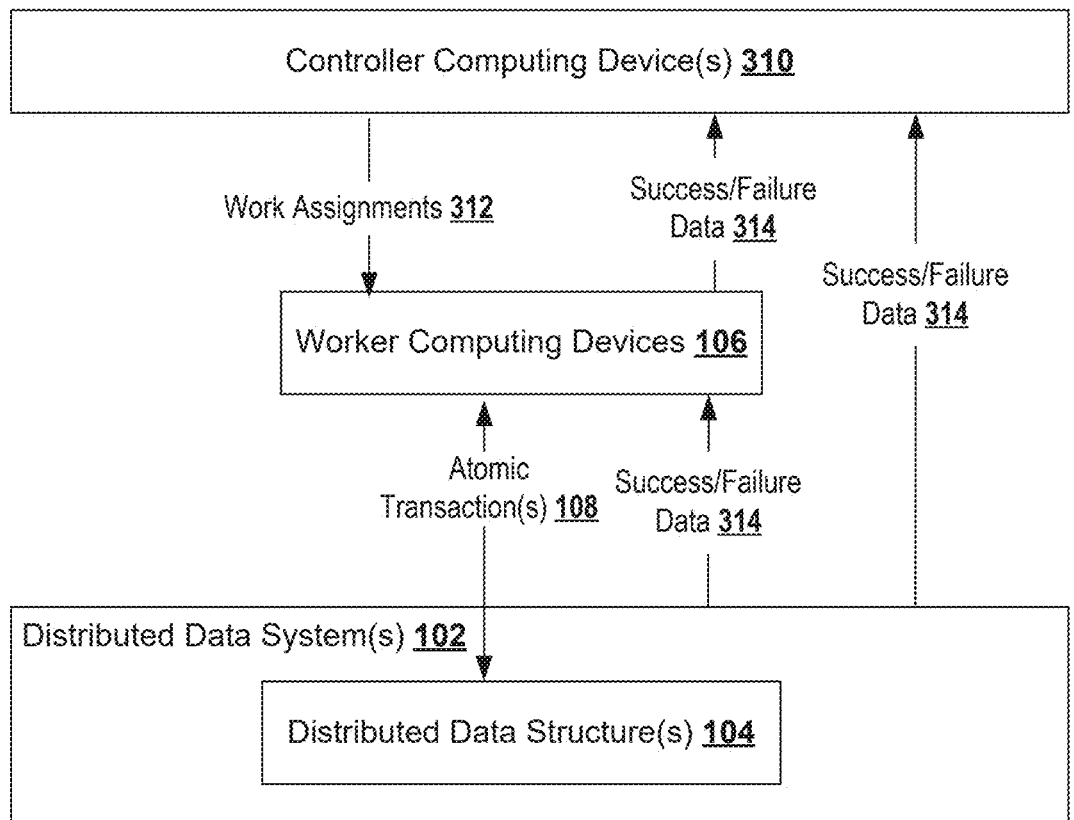
FIG. 3 is a block diagram of an example system for performing distributed analysis using atomic transactions according to example implementations of some aspects of the present disclosure.

Although the distributed node data structure 204a, distributed group data structure 204b, and distributed edge data structure 204c are depicted in FIG. 3 as three separate structures, a larger or smaller number (e.g., one, two, etc.) of data structures can be used without deviating from the scope of the present disclosure, and relevant graph data can be organized in any suitable way. For example, in some instances, data entry of a distributed node data structure 204a or distributed group data structure 204b may include edge data describing any relevant property of any edge connected to a node or group associated with the data entry.

In some instances, a distributed node data structure 204a and a distributed group data structure 204b can be configured to have similar (e.g., identical) formats to facilitate reuse of a distributed group data structure 204b as a distributed node data structure 204a in a later portion of a graph analysis process. For example, in some instances, a graph analysis process can include a hierarchical process configured to group, in a first iteration, one or more nodes into groups; then to treat the groups as nodes in a second iteration, such that the groups are grouped into groups of groups in a second iteration. In such instances, a distributed group data structure 204b can be configured to have a format identical to a format of a distributed node data structure 204a, and a distributed group data structure 204b written to in a first iteration can be used as a distributed node data structure 204a in a second iteration of such a graph analysis process. In this manner, for instance, a second iteration can be performed without initializing a new distributed node data structure 204a separate from the existing distributed group data structure 204b, thereby reducing an amount of memory usage (e.g., number of read/write accesses, memory bandwidth usage, etc.), reducing a latency, and increasing a throughput of a hierarchical graph analysis process.

In some instances, a plurality of data operations of an atomic transaction 108 can include one or more graph data retrieval operations, wherein a worker computing device 106 retrieves data from the distributed graph data structure 204, data indicative of one or more graph data values; one or more graph analysis operations, wherein the worker computing device 106 analyzes the one or more graph data values to generate one or more analysis data values (e.g., group assignment associated with a node for which data was retrieved, etc.); and one or more graph data write operations, wherein the worker computing device 106 writes the one or more analysis data values to the distributed data structure 104. In some instances, the plurality of data operations can be performed in a manner that ensures one or more of atomicity, consistency, isolation, and durability of the atomic transaction 108.

FIG. 3 is a block diagram of an example system for performing distributed analysis using atomic transactions 108 according to example implementations of some aspects of the present disclosure. A controller computing device 310 can provide one or more work assignments 312 to one or more worker computing devices 106. Based on the work assignments 312, the worker computing devices 106 can access one or more distributed data structures 104 in a distributed data system 102 via one or more atomic transactions 108. In some instances, the worker computing devices 106 or another device (e.g., device associated with a distributed data system 102) can provide, to the controller computing device 310, success/failure data 314 indicating whether one or more tasks have succeeded or failed. Based at least in part on the success/failure data 314, the controller computing device 310 can reassign one or more failed work assignments 312.

A controller computing device 310 can be or include one or more software, firmware, or hardware components configured to manage the operation of one or more worker computing devices 106. In some instances, an example component for managing the operation of one or more worker computing devices 106 can include a distributed processing system supporting data backups (e.g., Flume, etc.) or a distributed processing system supporting reattempts of failed units of work (e.g., Flume, etc.). In some instances, the controller computing device 310 can be, comprise, be comprised by, or otherwise share one or more properties with a computing device or system described below with respect to FIGS. 18-20 (e.g., server computing system 60, model development platform system 70, computing device 98, computing device 99, etc.).

A work assignment 312 can include, for example, any data indicative of one or more operations to be performed. In some instances, a work assignment 312 can include data indicative of one or more node assignments (e.g., node identifier data, etc.) assigning one or more graph nodes to a worker computing device 106. Other data types are possible.

In some instances, one or more controller computing devices 310 can store or otherwise access a data structure (e.g., master list, etc.) storing work assignment data, such as data indicative of work assignments 312 that have or have not been successfully completed; work assignments 312 that are currently ready or not ready to be performed; or other work assignment data. In some instances, a controller computing device 310 can allocate work assignments 312 based on the work assignment data, such as by mapping a plurality of nodes to a plurality of worker devices 106 (e.g., according to a MapReduce strategy, etc.), selecting (e.g., randomly, according to a heuristic, etc.) one or more nodes to be processed by one or more worker computing devices 106, or other allocation strategy. For example, in some instances, a graph analysis process can include a plurality of iterations wherein each node of a graph is processed one or more times, and a controller computing device can allocate, at the beginning of each iteration, a plurality of nodes to each worker computing device 106 of a plurality of worker computing devices 106.

Similarly, a worker computing device 106 can receive, from the controller computing device 310, a work assignment 312 indicative of one or more nodes to be processed; and perform, for each node of the one or more nodes, an atomic transaction 108 analyzing the node. In some instances, the worker computing device 106 can subsequently receive (e.g., from a distributed data system 102) or provide (e.g., to a controller computing device 310, etc.) success/failure data 314 indicating whether the atomic transaction was successfully completed. In some instances, the worker computing device 106 can re-attempt, responsive to receiving failure data indicating that an atomic transaction 108 was not successfully completed, the atomic transaction 108 (e.g., on its own initiative or responsive to a work assignment 312, etc.). In some instances, re-attempting an atomic transaction 108 can include re-retrieving data from one or more distributed data structures 104, 204; re-analyzing the re-retrieved data to generate one or more analysis data values (e.g., group assignments for a graph node, etc.); and writing the analysis data values to one or more distributed data structures 104, 204.

Success/failure data 314 can include, for example, data indicative of successful completion or non-completion of one or more atomic transactions 108; data indicative of data loss in a distributed data structure 104; or other success/failure data. Success/failure data can include data of any type, such as error message data, boolean success/failure data, success data only, failure data only, log data, or any other data indicative of one or more atomic transactions 108 that have or have not been successfully completed.

In some instances, the controller computing device 310 can allocate work assignments based at least in part on the success/failure data 314. For example, the controller computing device 310 can update work assignment data based on the success/failure data, and can allocate work assignments 312 based on the updated work assignment data. For example, in some instances, success/failure data 314 can include data indicative of data loss associated with a distributed data structure 104. In some instances, success/failure data 314 can include data indicative of data loss that occurred during an iteration of a graph analysis process, wherein each iteration may comprise a plurality of work assignments 312 for a plurality of worker computing devices 106. In such instances, the controller computing device 310 can assign one or more work assignments based on the success/failure data 314, such as by reassigning the same work assignments 312 assigned during the prior iteration attempt, by reassigning one or more individual work assignments associated with one or more data regions where data loss occurred, or other work assignment strategy. As another example, in some instances, a controller computing device 310 may receive success/failure data 314 associated with one or more individual atomic transactions 108, and may update work assignment data or reassign one or more work assignments 312 based on the success/failure data 314.

Figure 4A:
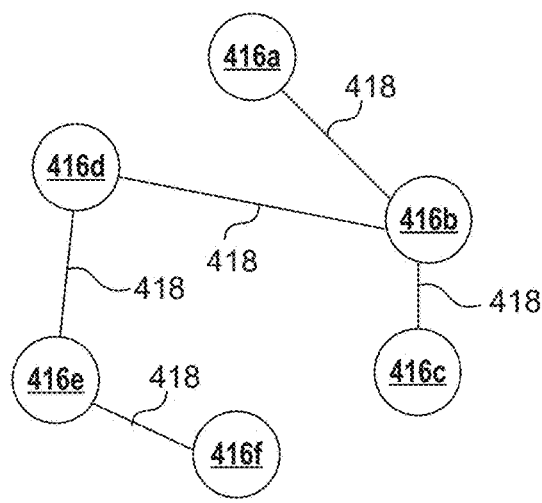
FIG. 4A is an illustration of a first view of an example method for performing graph analysis according to example implementations of some aspects of the present disclosure.
Figure 4B:
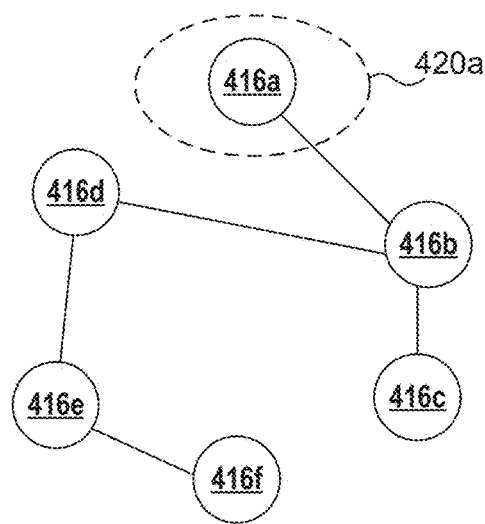
FIG. 4B is an illustration of a second view of an example method for performing graph analysis according to example implementations of some aspects of the present disclosure.
Figure 4C:
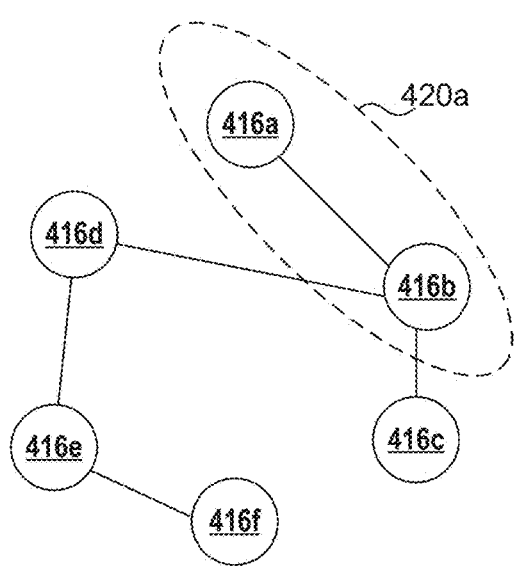
FIG. 4C is an illustration of a third view of an example method for performing graph analysis according to example implementations of some aspects of the present disclosure.
Figure 4D:
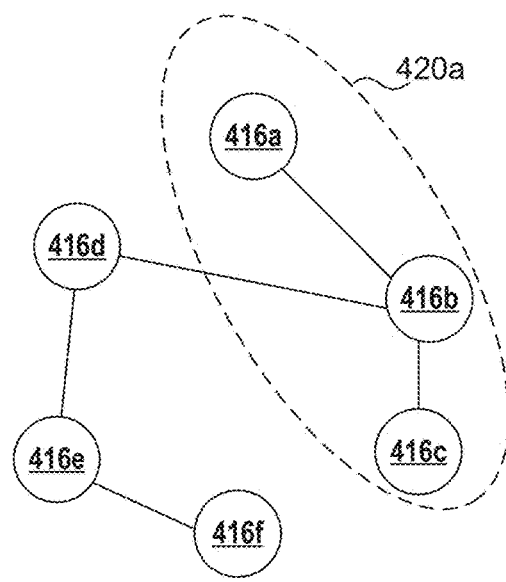
FIG. 4D is an illustration of a fourth view of an example method for performing graph analysis according to example implementations of some aspects of the present disclosure.
Figure 4E:
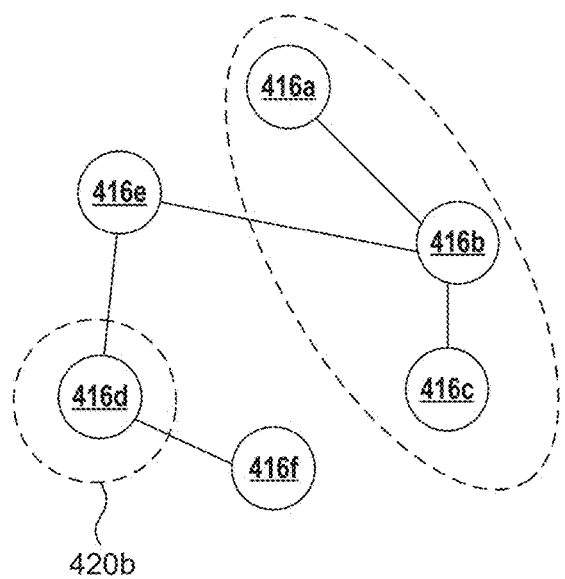
FIG. 4E is an illustration of a fifth view of an example method for performing graph analysis according to example implementations of some aspects of the present disclosure.
Figure 4F:
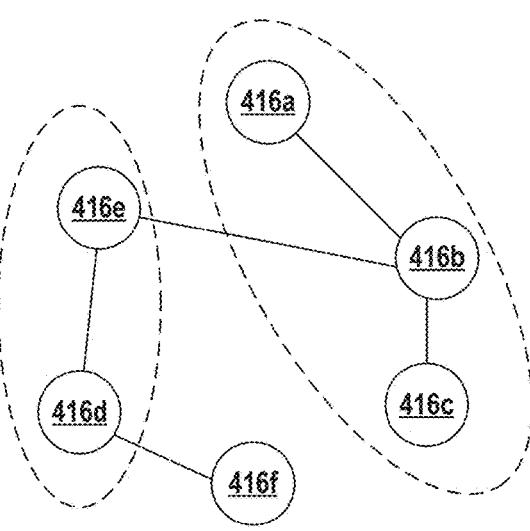
FIG. 4F is an illustration of a sixth view of an example method for performing graph analysis according to example implementations of some aspects of the present disclosure.

FIGS. 4A, 4B, 4C, 4D, 4E, 4F, 4G, and 4H are illustrations of a first, second, third, fourth, fifth, sixth, seventh, and eighth view, respectively, of an example method for performing graph analysis according to example implementations of some aspects of the present disclosure. FIG. 4A depicts an initial input state of a graph comprising a plurality of nodes 416a-f and edges 418. Responsive to the initial state, a first worker device 106 can perform an atomic transaction 106 retrieving node data for a first node 416a; analyzing the node data; and assigning, based on the analysis, the first node 416a to a first group 420a as depicted in FIG. 4B. Subsequently or in parallel with the first worker device, one or more second worker devices 106 (e.g., different from the first worker device 106) can perform atomic transactions 108 retrieving node data for another node 416b-f; analyzing the node data; and assigning, based on the analysis, the other node 416b-f to the first group 420a or a second group 420b as depicted in FIGS. 4C-4G. In some instances, after a plurality of nodes 416 have been assigned to 420, one or more of the groups 420 can be collapsed into one or more collapsed nodes 424 and one or more edges 418b, 418c can be combined into one or more collapsed edges 426, thereby generating a collapsed graph 422. In some instances, the process depicted in FIGS. 4A-4G can be repeated on the collapsed graph 422. For example, in some instances, a hierarchical graph analysis can include repeating the process of FIGS. 4A-4G k times, wherein k is a positive integer, including k−1 collapse iterations, to hierarchically group nodes and clusters into larger clusters. In some instances, a hierarchical graph analysis can include one or more (e.g., k−1) expansion iterations, wherein each node of a collapsed graph is re-expanded into its component nodes and a plurality of atomic transactions 108 (e.g., local optimization transactions) are performed on the expanded graph at each expansion iteration.

A node 416a-f can include, for example, a node (e.g., vertex, entity, etc.) of a graph or other graph-structured data. In some instances, data indicative of a node 416 can be, include, be included in, or otherwise be associated with a data entry of a distributed node data structure 204a. For example, in some instances, a node 416 can have one or more properties that can be stored in a distributed node data structure 204a (e.g., as described above with respect to FIG. 2).

An edge 418 can include, for example, an edge of a graph or other graph-structured data, such as an edge connecting two or more nodes 416. In some instances, data indicative of an edge 418 can be, include, be included in, or otherwise be associated with a data entry of a distributed graph data structure 204 (e.g., distributed node data structure 204*a*, distributed group data structure 204*b*, distributed edge data structure 204*c*, etc.). For example, in some instances, an edge 418 can have one or more properties that can be stored in a distributed graph data structure 204 (e.g., as described above with respect to FIG. 2).

A group 420 can include, for example, a group (e.g., cluster, partition, matching, etc.) associated with a graph or graph-structured data, such as a group of nodes or edges. In some instances, data indicative of a group 420 can be, include, be included in, or otherwise be associated with a data entry of a distributed group data structure 204*b*. For example, in some instances, a group 420 can have one or more properties that can be stored in a distributed group data structure 204*b* (e.g., as described above with respect to FIG. 2).

In some instances, the example method of FIG. 4 can include grouping a plurality of nodes 416 or edges 418 into groups 420 according to one or more grouping criteria, such as a modularity metric (e.g., for correlation clustering), a balancing metric (e.g., for balanced partitioning), a weight metric (e.g., for maximum-weight matching), or other grouping criterion. For example, in some instances, graph partitioning can include correlation clustering, wherein nodes are assigned to groups based on a modularity metric. A modularity metric can include, for example, a measure of the density of connections between nodes within a cluster in comparison to one or more other values, such as a density of between-cluster connections, a size of the cluster, an expected density of within-cluster connections (e.g., according to a random edge distribution, etc.), or other value. For example, in some instances, a modularity metric can be the difference between an actual percentage of within-cluster connections, minus an expected percentage of within-cluster connections.

Figure 4G:
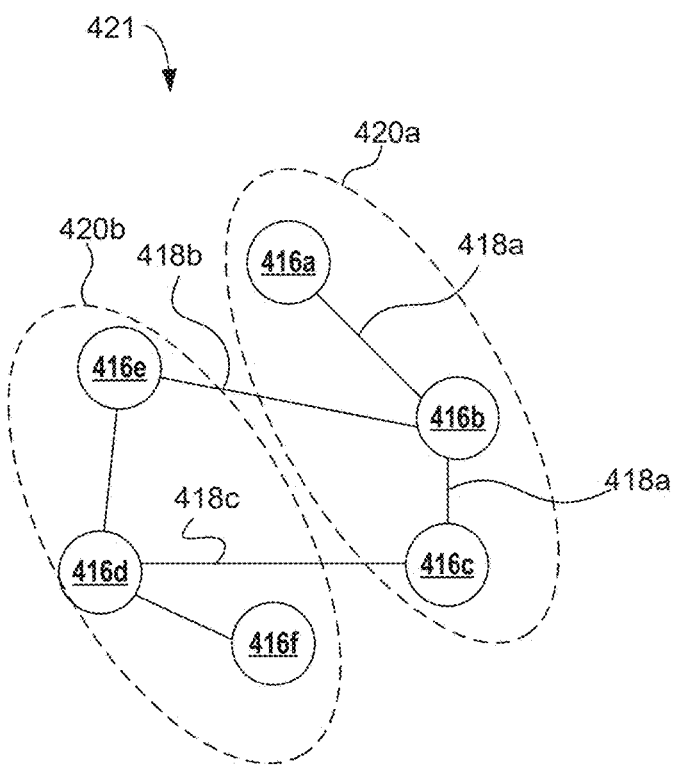
FIG. 4G is an illustration of a seventh view of an example method for performing graph analysis according to example implementations of some aspects of the present disclosure.
Figure 4H:
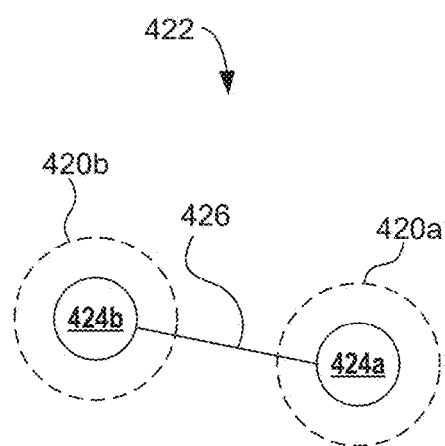
FIG. 4H is an illustration of an eighth view of an example method for performing graph analysis according to example implementations of some aspects of the present disclosure.

In some instances, the example method of FIGS. 4A through 4H can include a plurality of iterations, wherein each iteration comprises a plurality of local optimizations for a plurality of nodes. For example, FIGS. 4A through 4H can depict a first iteration, wherein a plurality of local optimizations are performed at FIGS. 4A through 4G, adding individual nodes to groups based on one or more locally optimal group assignments (e.g., assignments that locally optimize a grouping criterion such as a modularity metric). At FIG. 4H, the graph can be collapsed, and one or additional iterations (not depicted) can be performed. In some instances, after one or more iterations are performed on one or more collapsed graphs, the collapsed graphs can be re-expanded (e.g., expanded from a collapsed state as depicted in FIG. 4H to an expanded state as depicted in FIG. 4G), and additional iterations (not depicted) can be performed on the expanded graphs.

In some instances, a distributed graph analysis can include, for each of a plurality of iterations, performing an atomic transaction 108 on each node 416, each edge 418, or other components of a graph. In some instances, each atomic transaction 108 can include retrieving, by a worker computing device 106 from a distributed data structure 104, data associated with one or more nodes 416 or edges 418 (e.g., node 416 or edge 418 assigned to the worker computing device 106 by a controller computing device 310); analyzing the retrieved data; and writing analysis data to the distributed data structure 104. For example, in some instances, each atomic transaction 108 can include retrieving data associated with a node 416 or edge 418; determining a group assignment based on the data; and writing, by the worker computing device 106, group assignment data indicative of the group assignment.

In some instances, a distributed graph analysis can include one or more heuristic optimizations, such as a greedy heuristic optimization comprising a plurality of local optimizations. In some instances, each atomic transaction can comprise a local optimization assigning the node 416 or edge 418 to a locally optimal group according to a grouping criterion (e.g., modularity metric, balance metric, total weight metric, etc.). For example, in some instances, an atomic transaction 108 can include retrieving, by a worker computing device 106 from a distributed graph data structure 204, node data associated with a node 416 to be grouped (e.g., node 416 assigned by a controller computing device 310, etc.), node data associated with one or more neighbors of the node being grouped; cluster data associated with one or more groups 420 to which the node or its neighbors belong; edge data associated with one or more edges 418 of the node, its neighbors, and one or more clusters to which the node or its neighbors belong; or other data. In some instances, an atomic transaction 108 can further include computing, for each of a plurality of candidate groupings, a numerical grouping criterion value (e.g., modularity metric value, balance metric value, total weight value, etc.). A candidate grouping can include, for example, a candidate grouping wherein a node or edge being grouped is temporarily assigned to or treated as being a part of a candidate group, and computing a grouping criterion value based on the candidate grouping. In some instances, a plurality of candidate groups can include one or more groups associated with one or more neighbors of a node or edge being grouped; one or more groups associated with the node or edge itself (e.g., groups to which the node or edge currently belongs or belonged before the current local optimization step); or other candidate groups.

In some instances, a plurality of local optimizations can be performed for each node at each iteration (e.g., before collapsing or expanding a graph as depicted in FIG. 4G). For example, an iteration can include performing a first pass beginning with no defined groups 420 (e.g., as depicted in 4A), wherein each node 416 or edge 418 is analyzed or otherwise processed (e.g., assigned to a group 420 based on a local optimization, etc.) once. The iteration can further include one or more (e.g., five, seven, nine, etc.) second passes, wherein a starting point can be a full set of groups 420 (e.g., singleton groups 420 comprising only one node 416 or edge 418, multi-node or multi-edge groups 420, etc.) determined in a previous (e.g., first) pass. In some instances, a number of passes per iteration can be a tunable hyperparameter. In some instances, a number of passes per iteration can be determined according to a convergence criterion or stopping criterion. For example, in some instances, an iteration can be stopped when a number of group assignments changed by a pass is less than or equal to a predetermined threshold (e.g., zero, one percent of nodes 416 or edges 418, 0.1 percent, 0.01 percent, etc.).

In some instances, an atomic transaction 108 can further include assigning the node or edge to the candidate group having the best (e.g., highest) grouping criterion value. An atomic transaction 108 can further include, for example, one or more write operations writing group assignment data indicative of the assignment to a distributed graph data structure 204. For example, in some instances, an atomic transaction 108 can include a first write operation writing group data (e.g., group identifier, etc.) to a data entry of a distributed node data structure 204*a* or distributed edge data structure 204c, the data entry being associated with the node or edge being grouped. In some instances, the atomic transaction 108 can further include a second write operation writing data (e.g., group size data, member data, etc.) to a distributed group data structure 204b based on the assignment; or additional write operations.

In some instances, the atomic transaction 108 can be configured to ensure that all retrieval and write transactions of the atomic transaction 108 are performed in a manner that conforms to one or more ACID principles, such as atomicity, consistency, or isolation. For example, the atomic transaction 108 can be performed in a manner that ensures that either: all write operations of a plurality of write operations of the atomic transaction 108 are performed successfully; or no write operations of the plurality of operations are committed to a distributed data structure 104. For example, the atomic transaction 108 can terminate without writing if a condition prevents all write operations from being performed successfully; roll back one or more temporary write operations if another write operation of the atomic transaction 108 fails; wait (e.g., hold, sleep, etc.) until all write operations can be performed (e.g., wait for one or more locks or mutexes to be released, etc.) before performing all write operations together; or use another method to ensure atomicity. As another example, the atomic transaction 108 can be performed in a manner that ensures that concurrent atomic transactions 108 performed by a plurality of worker computing devices 106 lead to the same distributed data structure 104 state as if the atomic transactions 108 were performed sequentially. For example, in some instances, an atomic transaction 108 can be performed in a manner that prevents a worker computing device 106 from writing group assignment data to a distributed data structure 104 if any data it relied on to determine the group assignment (e.g., data retrieved from a distributed data structure 104) was modified after retrieval (e.g., by setting the data to read-only before retrieval and releasing the data only afterward, etc.).

As another example, the atomic transaction 108 can be performed in a manner that ensures that a distributed data structure 104 always satisfies one or more invariant constraints, such as a constraint that no atomic transaction 108 can change a total number or weight of edges in a graph, a total number or weight of edges connected to a node, a total number or weight of nodes in a graph, or other invariant value. In some instances, the atomic transaction 108 can be performed in a manner that ensures that a plurality of distributed graph data structures 204a, 204b, 204c are consistent with each other. For example, if a distributed node data structure 204a comprises data indicating that a particular node 416 belongs to a particular group 420, an example constraint can require that a corresponding distributed group data structure 204b includes a data entry (e.g., member list data entry, etc.) showing that the node 416 is a member of the group 420. Other constraints are possible.

In some instances, a distributed graph analysis can include hierarchically collapsing or expanding one or more groups 420 of the graph (e.g., at the end of each iteration), and performing one or more additional operations (e.g., additional iterations) on the collapsed or expanded graph. For example, as depicted in FIGS. 4G and 4H, a first graph 421 can be collapsed into a first collapsed graph 422 based on one or more groups 420. For example, collapsing a first graph 421 can include collapsing group 420a, 420b of the first graph 421 into a collapsed node 424a, 424b. In some instances, one or more collapsed nodes 424a, 424b can be further grouped into groups 420 of collapsed nodes 424 (e.g., at a second iteration performed subsequent to the operations depicted in FIGS. 4G and 4H, etc.). In some instances, the groups 420 of collapsed nodes 424 can be further collapsed (e.g., at later iterations), and the doubly collapsed nodes can be grouped into groups 420 of doubly collapsed nodes (e.g., in the same or similar manner as nodes 416 can be grouped). In some instances, this collapse-and-further-group process can be repeated hierarchically to a predetermined collapse depth. For example, in some instances, a first k iterations of a graph analysis process can include a first iteration grouping individual nodes 416, and a further k−1 iterations (e.g., second iteration, third iteration, . . . , $k^{th}$ iteration) on collapsed graphs that have been collapsed to a collapse depth associated with the iteration (depth of 1, 2, . . . , k−1 respectively). In some instances, k can be a tunable hyperparameter.

As used herein, "collapse depth" can refer to a number of times that a graph has been collapsed by treating its groups 420 as individual collapsed nodes 424. An initial graph to be analyzed can have a collapse depth of zero. After an initial graph is collapsed such that its groups 420 become collapsed nodes 424 as depicted in 4H, it can have a collapse depth of one. If the collapsed nodes 424 of a graph having a collapse depth of d are grouped and the resulting groups are collapsed again, the resulting graph can have a collapse depth of d+1. Conversely, if a graph having a collapse depth of d is expanded, such that each of its collapsed nodes 424 is expanded into a group 420 having a plurality of member nodes 416 or member collapsed nodes 424, the resulting graph can have a collapse depth of d−1.

In some instances, collapsing a graph can include converting one or more edges 418 into weighted edges 418, or modifying a weight of one or more weighted edges 418. For example, in some instances, an edge 418 of an initial graph to be analyzed can have an initial weight. In some instances, every edge 418 of an initial graph can share a default initial weight, such as one. In some instances, collapsing a graph can include collapsing a plurality of edges 418 between two groups 420 into a collapsed edge 426. In some instances, a weight of a collapsed edge 426 between two groups 420 can be equal to a sum of weights of a plurality of edges 418b, 418c between nodes 416 of the two groups 420.

In some instances, edges 418a between nodes 416 within the same group 420 can be deleted or ignored, such as in a hierarchical graph analysis process where collapsed nodes 424 are grouped together based on collapsed edges 426 between the collapsed nodes 424, wherein member nodes 416 of the collapsed node 424 are not moved between nodes during the collapsed grouping process, and wherein a grouping criterion (e.g., modularity metric, etc.) may not depend on any properties of within-group edges 418a between member nodes 416 of a collapsed node 424.

In some instances, a grouped collapsed graph (e.g., a collapsed graph and collapsed grouping determined after a first k iterations, etc.) can be expanded one or more times, and one or more iterations can be performed to locally optimize one or more group assignments of the expanded graph. For example, in some instances, k−1 expansion iterations can be performed, wherein a collapsed graph that has been collapsed to a collapse depth of k−1 can be hierarchically expanded and regrouped in a plurality of iterations. For example, in some instances, a collapsed graph having a collapse depth of k−1 can be expanded (e.g., at a $(k+1)^{th}$ iteration of an overall analysis process, etc.) into a graph having a collapse depth of k−2, and a plurality of atomic transactions 108 can be performed to locally optimize group assignments of a plurality of nodes 424, 416 of the expanded graph. Expanding a graph can include, for example, expanding a collapsed node 424 into a group 420 comprising a plurality of member nodes 416, 424; expanding a group 420 comprising a plurality of collapsed nodes 424 into a single merged group 420 comprising all member nodes 416, 424 of the collapsed nodes 424; or the like.

In some instances, one or more operations (e.g., atomic transactions 108, etc.) for grouping or otherwise analyzing a collapsed node 424 during a collapse iteration or expansion iteration can be similar (e.g., identical) to any operation described herein for grouping or otherwise analyzing a node 416 or edge 418.

In some instances, read and write operations of an atomic operation 108 can be substantially identical regardless of whether a node 416, 424 being grouped is a node 416 of an initial graph or a collapsed node 424 of a collapsed graph, and regardless of a collapse depth of a collapsed graph. In some instances, a file format of a distributed group data structure 204b can be similar to (e.g., same as) a file format of a distributed node data structure 204a or distributed edge data structure 204c. In some instances, a distributed group data structure 204b can be retained after a first iteration is performed, and used as a distributed node data structure 204a in a later iteration. In this manner, for instance, groups 420 of a first graph determined in a first iteration can be treated as collapsed nodes 424 of a collapsed graph in a second iteration, in some instances without requiring additional data processing to generate a distributed data structure 104 describing the collapsed nodes 424. In some instances, a file size of a distributed group data structure 204b can be large enough to facilitate reuse of the distributed group data structure 204b as a distributed node data structure 204a. For example, in some instances, a file size of the distributed group data structure 204b can be large enough to hold (1+ε)n data entries, where n can be a number of nodes 416 of a graph, and ε can be a small value (e.g., 0.1, 1, etc.) or tunable hyperparameter.

In some instances, a graph analysis process can include transferring data from a distributed data system 102 (e.g., distributed data system 102 comprising volatile memory) to another system (e.g., distributed processing system such as Flume or Dataflow; backup data system or non-volatile data storage system; etc.). For example, in some iterations, a copy of one or more distributed data structures 104 (e.g., distributed graph data structures 204, etc.) can be provided to another system (e.g., Flume, etc.) at the end of each iteration of a hierarchical graph analysis process (e.g., each collapse/expansion iteration); at the end of each pass of a graph analysis process (e.g., pass comprising one local optimization for each node 416, 424 of a graph); or at other times. In some instances, one or more synchronization controls (e.g., MustFollow command, Flume synchronization commands, etc.) can be implemented to ensure that data is extracted from the distributed data system 102 only after a first designated operation (e.g., first pass, first iteration, etc.) has been completed. Similarly, one or more synchronization controls can be implemented to ensure that a distributed data structure 104 is fully extracted from the distributed data system 102 and written to another system (e.g., storage system, distributed processing system such as Flume, etc.) before a second designated operation (e.g., second pass, second iteration, etc.) begins. In some instances, one or more data loss checks can be performed before data is extracted from a distributed data system 102 to another data system. For example, in some instances, an extraction can be performed only if data has not been lost from a distributed data system 102 (e.g., RDMA distributed data system 102) during a particular operation (e.g., pass, iteration, etc.). As another example, in some instances, one or more operations (e.g., atomic transactions 108, etc.) can be performed to recover or recompute lost data before extracting data from the distributed data system 102 to another system.

In some instances, a graph analysis process may include coordination between two or more distributed processing systems. For example, in some instances, a first distributed processing system (e.g., system supporting atomic remote direct memory access transactions modifying arbitrary data, etc.) can perform, at each iteration, a plurality of local optimization steps for a plurality of nodes 416 or edges 418, while a second distributed processing system (e.g., Flume, etc.) can provide synchronization or other coordination between iterations, work assignment allocation functions, or other functions. In some instances, a second distributed processing system (e.g., Flume) can include a distributed processing that supports backups of data computed during a graph analysis process (e.g., data extracted at the end of each iteration, etc.). In some instances, a second distributed processing system can include a distributed processing that supports retrying failed units of work (e.g., retrying an iteration in the event of data loss associated with a first distributed processing system, etc.). In some instances, a first distributed processing system can include a system that supports frequent coordination (e.g., multiple coordination actions per second, low-latency RDMA coordination, etc.) between computing devices. For example, a limitation of some distributed processing systems (e.g., Flume, etc.) is that stages of some staged analysis processes can take tens of seconds to complete, making frequent coordination infeasible in some instances. Advantageously, dual-system implementations according to some aspects of the present disclosure can provide frequent coordination during each iteration, while providing other coordination functions (e.g., synchronization, backup storage such as non-volatile backup storage, etc.) associated with one or more systems that may not support frequent coordination.

In some instances, a node 416 or edge 418 can be assigned to a group 420 comprising only the node 416 or edge 418 itself and no other nodes 416 or edges 418, referred to herein as a "singleton group." In some instances, assigning a node 416 to a singleton group 420 can include generating a cluster identifier (e.g., random identifier, sequential identifier, etc.) and saving data associated with the node 416 or edge 418 in a data entry (e.g., data entry of a distributed group data structure 204b, etc.) associated with the cluster identifier (e.g., in addition to other write operations, such as writing the cluster identifier to a data entry associated with the node 416 or edge 418 in a distributed node or graph data structure 204a, 204c, etc.). However, this is not required. For example, in some instances, a specially designated singleton cluster identifier can be used, and cluster data can be written to a distributed group data structure 204b only when a group 420 has two or more members. In some instances, using a specially designated singleton cluster identifier can provide reduced computational costs compared to generating a new cluster identifier for every singleton group 420, such as reduced footprint of a distributed group data structure 204b or reduced communication or memory access costs (e.g., reduced memory access bandwidth required, etc.), while generating a new cluster identifier may provide other benefits (e.g., simplified coding, etc.).

Example Methods

Figure 5:
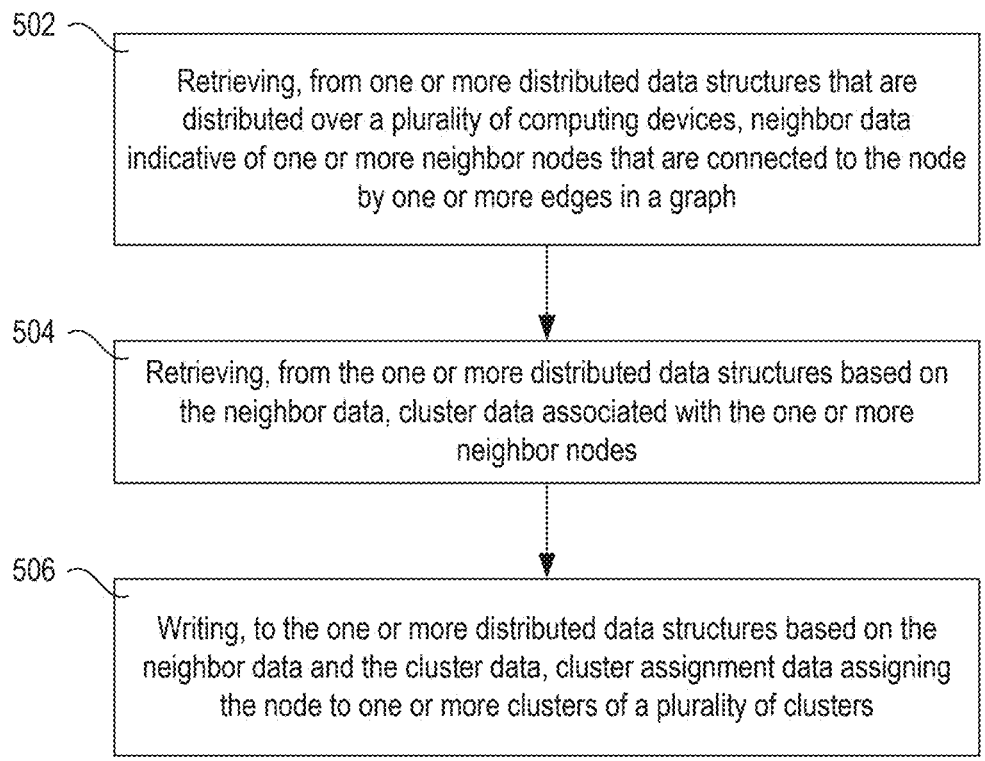
FIG. 5 is a flow chart diagram of an example method for performing distributed analysis according to example implementations of some aspects of the present disclosure.

FIG. 5 depicts a flowchart diagram of an example method for performing an atomic transaction or local optimization according to example embodiments of the present disclosure. Although FIG. 5 depicts steps performed in a particular order for purposes of illustration and discussion, the methods of the present disclosure are not limited to the particularly illustrated order or arrangement. The various steps of example method 500 can be omitted, rearranged, combined, and/or adapted in various ways without deviating from the scope of the present disclosure.

At 502, example method 500 can include retrieving, from one or more distributed data structures (e.g., distributed data structures 104, 204) that are distributed over a plurality of computing devices, neighbor data indicative of one or more neighbor nodes (e.g., nodes 416, 424) that are connected to the node by one or more edges (e.g., edges 418, 426) in a graph. In some instances, example method 500 at 502 can include using one or more systems or performing one or more activities described with respect to FIGS. 1 through 4H.

At 504, example method 500 can include retrieving, from the one or more distributed data structures based on the neighbor data, cluster data associated with the one or more neighbor nodes. In some instances, example method 500 at 504 can include using one or more systems or performing one or more activities described with respect to FIGS. 1 through 4H.

At 506, example method 500 can include writing, to the one or more distributed data structures based on the neighbor data and the cluster data, cluster assignment data assigning the node to one or more clusters (e.g., groups 420) of a plurality of clusters. In some instances, example method 500 at 506 can include using one or more systems or performing one or more activities described with respect to FIGS. 1 through 4H.

In some instances, example method 500 can be performed a plurality of times. For example, in some instances, an example method can include, for each of a plurality of iterations, performing example method 500 on each node of a plurality of nodes of a graph.

Figure 6:
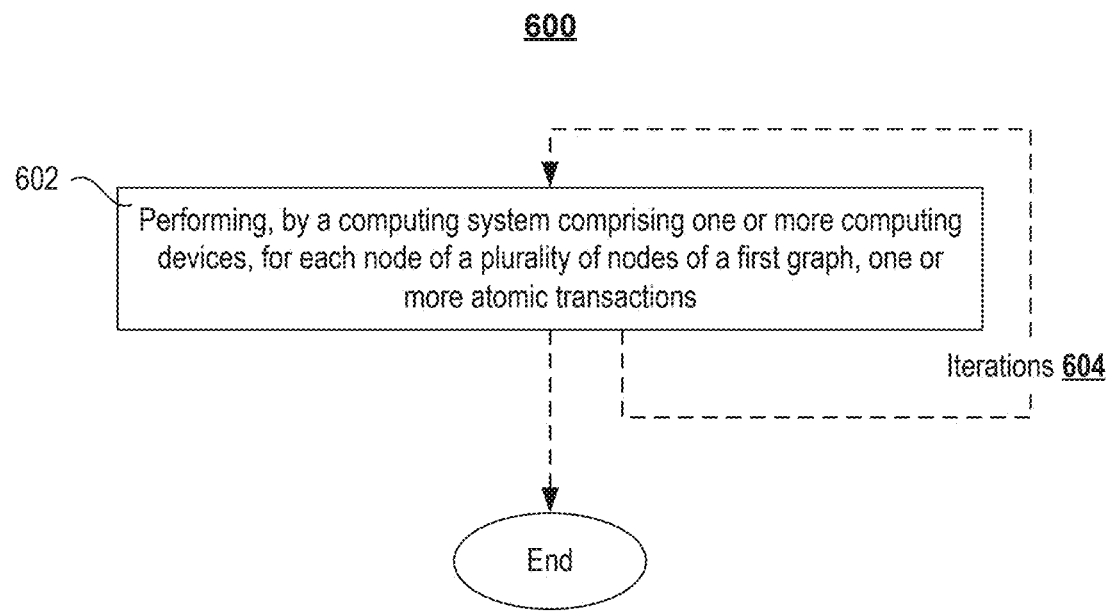
FIG. 6 is a flow chart diagram of an example method for performing distributed analysis according to example implementations of some aspects of the present disclosure.

FIG. 6 depicts a flowchart diagram of an example method for graph analysis according to example embodiments of the present disclosure. Although FIG. 6 depicts steps performed in a particular order for purposes of illustration and discussion, the methods of the present disclosure are not limited to the particularly illustrated order or arrangement. The various steps of example method 600 can be omitted, rearranged, combined, and/or adapted in various ways without deviating from the scope of the present disclosure.

At 602, example method 600 can include performing, by a computing system comprising one or more computing devices, for each node of a plurality of nodes of a first graph, one or more atomic transactions (e.g., atomic transactions 108, atomic transactions comprising example method 500, etc.). In some instances, example method 600 at 602 can include using one or more systems or performing one or more activities described with respect to FIGS. 1 through 4H.

In some instances, example method 600 can include performing a plurality of iterations 604. An iteration 604 can include, for example, any activity performed with respect to example method 600 at 602.

Figure 7:
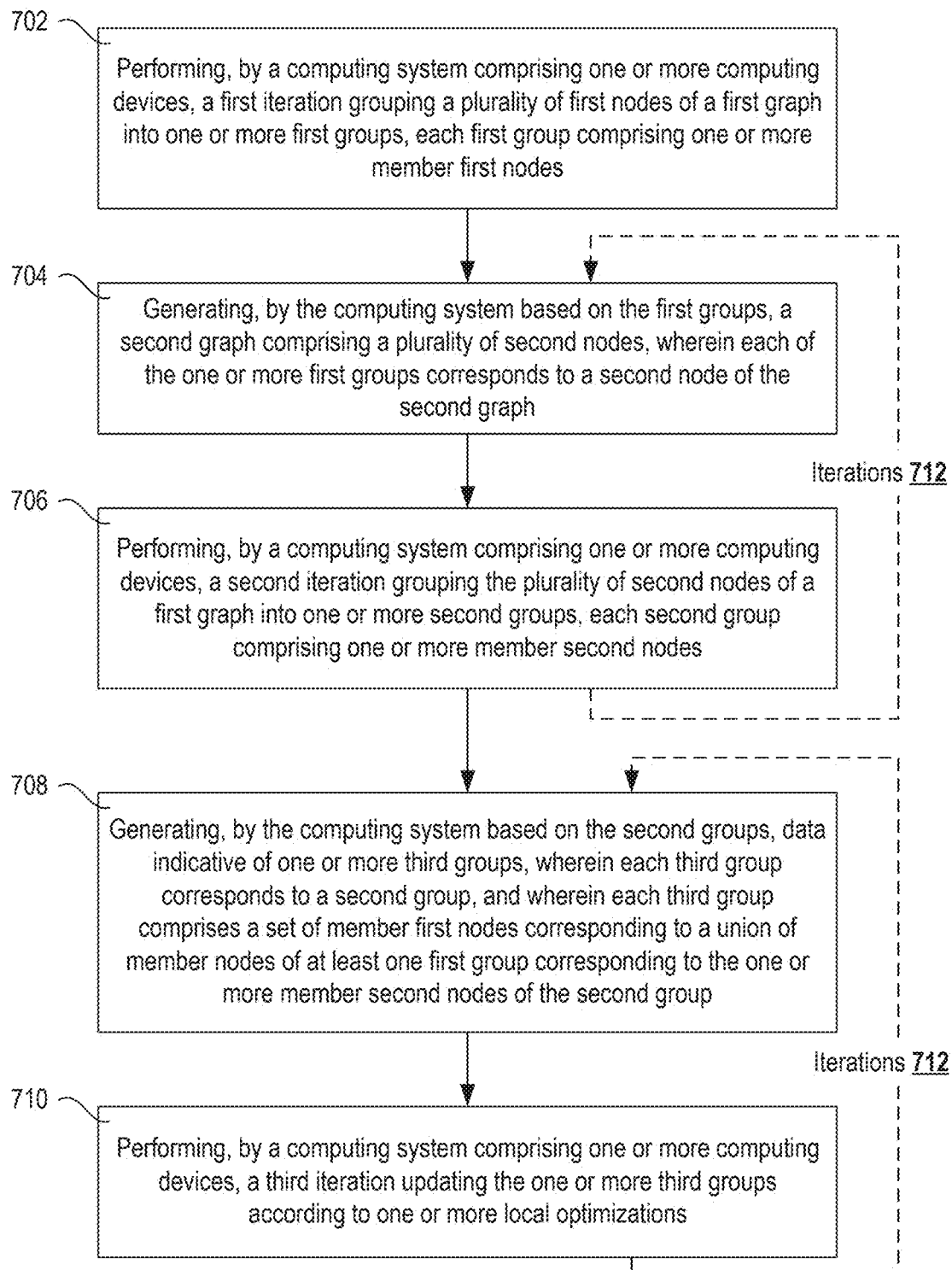
FIG. 7 is a flow chart diagram of an example method for performing distributed analysis according to example implementations of some aspects of the present disclosure.

FIG. 7 depicts a flowchart diagram of an example method for hierarchical graph analysis according to example embodiments of the present disclosure. Although FIG. 7 depicts steps performed in a particular order for purposes of illustration and discussion, the methods of the present disclosure are not limited to the particularly illustrated order or arrangement. The various steps of example method 700 can be omitted, rearranged, combined, and/or adapted in various ways without deviating from the scope of the present disclosure.

At 702, example method 700 can include performing, by a computing system comprising one or more computing devices (e.g., worker computing devices 106, controller computing devices 310, etc.), a first iteration (e.g., iteration 604, etc.) grouping a plurality of first nodes (e.g., nodes 416) of a first graph into one or more first groups (e.g., groups 420), each first group comprising one or more member first nodes. In some instances, example method 700 at 702 can include using one or more systems or performing one or more activities described with respect to FIGS. 1 through 4H.

At 704, example method 700 can include generating, by the computing system based on the first groups, a second graph comprising a plurality of second nodes (e.g., nodes 424), wherein each of the one or more first groups corresponds to a second node of the second graph. In some instances, example method 700 at 704 can include using one or more systems or performing one or more activities described with respect to FIGS. 1 through 4H.

At 706, example method 700 can include performing, by a computing system comprising one or more computing devices, a second iteration grouping the plurality of second nodes of a first graph into one or more second groups, each second group comprising one or more member second nodes. In some instances, example method 700 at 706 can include using one or more systems or performing one or more activities described with respect to FIGS. 1 through 4H.

In some instances, example method 700 at 704 and 706 can be repeated for a plurality of iterations 712 (e.g., as described above with respect to FIGS. 4A through 4H).

At 708, example method 700 can include generating, by the computing system based on the second groups, data indicative of one or more third groups, wherein each third group corresponds to a second group, and wherein each third group comprises a set of member first nodes corresponding to a union of member nodes of at least one first group corresponding to the one or more member second nodes of the second group. In some instances, example method 700 at 708 can include using one or more systems or performing one or more activities described with respect to FIGS. 1 through 4H.

At 710, example method 700 can include performing, by a computing system comprising one or more computing devices, a third iteration updating the one or more third groups according to one or more local optimizations. In some instances, example method 700 at 710 can include using one or more systems or performing one or more activities described with respect to FIGS. 1 through 4H.

In some instances, example method 700 at 708 and 710 can be repeated for a plurality of iterations 712. In some instances, a number of iterations 712 in which example method 700 at 708 and 710 are performed can be the same as or different from a number of iterations 712 in which example method 700 at 704 and 706 are performed (e.g., k times for each as described above with respect to FIGS. 4A through 4H).

Figure 8:
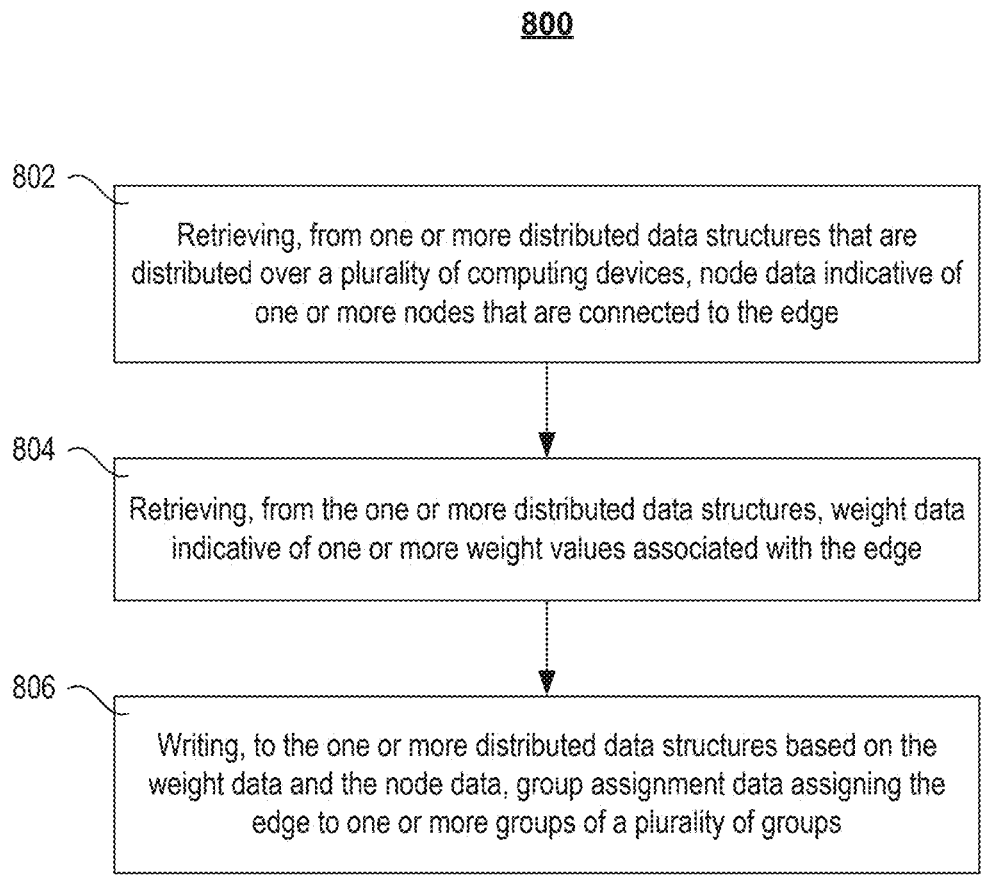
FIG. 8 is a flow chart diagram of an example method for performing distributed analysis according to example implementations of some aspects of the present disclosure.

FIG. 8 depicts a flowchart diagram of an example method for grouping edges of a graph according to example embodiments of the present disclosure. Although FIG. 8 depicts steps performed in a particular order for purposes of illustration and discussion, the methods of the present disclosure are not limited to the particularly illustrated order or arrangement. The various steps of example method 800 can be omitted, rearranged, combined, and/or adapted in various ways without deviating from the scope of the present disclosure.

At 802, example method 800 can include retrieving, from one or more distributed data structures (e.g., distributed data structures 104, etc.) that are distributed over a plurality of computing devices, node data indicative of one or more nodes (e.g., nodes 416) that are connected to the edge (e.g., edge 418). In some instances, example method 800 at 802 can include using one or more systems or performing one or more activities described with respect to FIGS. 1 through 4H.

At 804, example method 800 can include retrieving, from the one or more distributed data structures, weight data indicative of one or more weight values associated with the edge. In some instances, example method 800 at 804 can include using one or more systems or performing one or more activities described with respect to FIGS. 1 through 4H.

At 806, example method 800 can include writing, to the one or more distributed data structures based on the weight data and the node data, group assignment data assigning the edge to one or more groups of a plurality of groups. In some instances, example method 800 at 806 can include using one or more systems or performing one or more activities described with respect to FIGS. 1 through 4H.

In some instances, example method 800 can be performed a plurality of times. For example, in some instances, an example method can include, for each of a plurality of iterations, performing example method 800 on each node of a plurality of nodes of a graph.

Example Computing Systems and Devices

Figure 9:
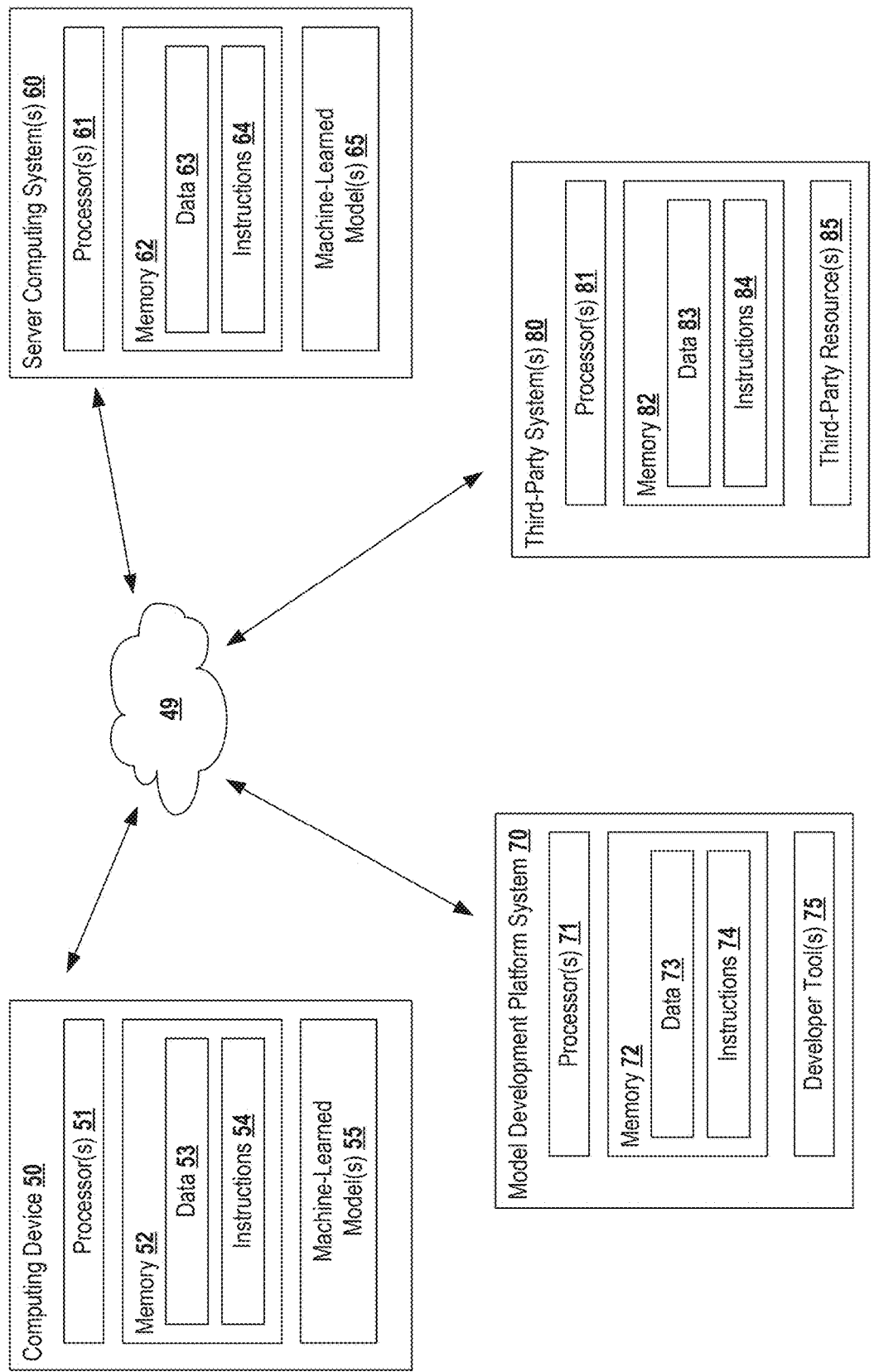
FIG. 9 is a block diagram of an example networked computing system according to example implementations of aspects of the present disclosure.

FIG. 9 is a block diagram of an example networked computing system that can perform aspects of example implementations of the present disclosure. The system can include a number of computing devices and systems that are communicatively coupled over a network 49. An example computing device 50 is described to provide an example of a computing device that can perform any aspect of the present disclosure (e.g., implementing model host 31, client(s) 32, or both). An example server computing system 60 is described as an example of a server computing system that can perform any aspect of the present disclosure (e.g., implementing model host 31, client(s) 32, or both). Computing device 50 and server computing system(s) 60 can cooperatively interact (e.g., over network 49) to perform any aspect of the present disclosure (e.g., implementing model host 31, client(s) 32, or both). Model development platform system 70 is an example system that can host or serve model development platform(s) 12 for development of machine-learned models. Third-party system(s) 80 are example system(s) with which any of computing device 50, server computing system(s) 60, or model development platform system(s) 70 can interact in the performance of various aspects of the present disclosure (e.g., engaging third-party tools, accessing third-party databases or other resources, etc.).

Network 49 can be any type of communications network, such as a local area network (e.g., intranet), wide area network (e.g., Internet), or some combination thereof and can include any number of wired or wireless links. In general, communication over network 49 can be carried via any type of wired or wireless connection, using a wide variety of communication protocols (e.g., TCP/IP, HTTP, SMTP, FTP), encodings or formats (e.g., HTML, XML), or protection schemes (e.g., VPN, secure HTTP, SSL). Network 49 can also be implemented via a system bus. For instance, one or more devices or systems of FIG. 9 can be co-located with, contained by, or otherwise integrated into one or more other devices or systems.

Computing device 50 can be any type of computing device, such as, for example, a personal computing device (e.g., laptop or desktop), a mobile computing device (e.g., smartphone or tablet), a gaming console or controller, a wearable computing device, an embedded computing device, a server computing device, a virtual machine operating on a host device, or any other type of computing device. Computing device 50 can be a client computing device. Computing device 50 can be an end-user computing device. Computing device 50 can be a computing device of a service provided that provides a service to an end user (who may use another computing device to interact with computing device 50).

Computing device 50 can include one or more processors 51 and a memory 52. Processor(s) 51 can be any suitable processing device (e.g., a processor core, a microprocessor, an ASIC, an FPGA, a controller, a microcontroller, etc.) and can be one processor or a plurality of processors that are operatively connected. Memory 52 can include one or more non-transitory computer-readable storage media, such as HBM, RAM, ROM, EEPROM, EPROM, flash memory devices, magnetic disks, etc., and combinations thereof. Memory 52 can store data 53 and instructions 54 which can be executed by processor(s) 51 to cause computing device 50 to perform operations. The operations can implement any one or multiple features described herein. The operations can implement example methods and techniques described herein.

Computing device 50 can also include one or more input components that receive user input. For example, a user input component can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, camera, LIDAR, a physical keyboard or other buttons, or other means by which a user can provide user input.

Computing device 50 can store or include one or more machine-learned models 55. Machine-learned models 55 can include one or more machine-learned model(s) 1, such as a sequence processing model 4. Machine-learned models 55 can include one or multiple model instance(s) 31-1. Machine-learned model(s) 55 can be received from server computing system(s) 60, model development platform system 70, third party system(s) 80 (e.g., an application distribution platform), or developed locally on computing device 50. Machine-learned model(s) 55 can be loaded into memory 52 and used or otherwise implemented by processor(s) 51. Computing device 50 can implement multiple parallel instances of machine-learned model(s) 55.

Server computing system(s) 60 can include one or more processors 61 and a memory 62. Processor(s) 61 can be any suitable processing device (e.g., a processor core, a microprocessor, an ASIC, an FPGA, a controller, a microcontroller, etc.) and can be one processor or a plurality of processors that are operatively connected. Memory 62 can include one or more non-transitory computer-readable storage media, such as HBM, RAM, ROM, EEPROM, EPROM, flash memory devices, magnetic disks, etc., and combinations thereof. Memory 62 can store data 63 and instructions 64 which can be executed by processor(s) 61 to cause server computing system(s) 60 to perform operations. The operations can implement any one or multiple features described herein. The operations can implement example methods and techniques described herein.

In some implementations, server computing system 60 includes or is otherwise implemented by one or multiple server computing devices. In instances in which server computing system 60 includes multiple server computing devices, such server computing devices can operate according to sequential computing architectures, parallel computing architectures, or some combination thereof.

Server computing system 60 can store or otherwise include one or more machine-learned models 65. Machine-learned model(s) 65 can be the same as or different from machine-learned model(s) 55. Machine-learned models 65 can include one or more machine-learned model(s) 1, such as a sequence processing model 4. Machine-learned models 65 can include one or multiple model instance(s) 31-1. Machine-learned model(s) 65 can be received from computing device 50, model development platform system 70, third party system(s) 80, or developed locally on server computing system(s) 60. Machine-learned model(s) 65 can be loaded into memory 62 and used or otherwise implemented by processor(s) 61. Server computing system(s) 60 can implement multiple parallel instances of machine-learned model(s) 65.

In an example configuration, machine-learned models 65 can be included in or otherwise stored and implemented by server computing system 60 to establish a client-server relationship with computing device 50 for serving model inferences. For instance, server computing system(s) 60 can implement model host 31 on behalf of client(s) 32 on computing device 50. For instance, machine-learned models 65 can be implemented by server computing system 60 as a portion of a web service (e.g., remote machine-learned model hosting service, such as an online interface for performing machine-learned model operations over a network on server computing system(s) 60). For instance, server computing system(s) 60 can communicate with computing device 50 over a local intranet or internet connection. For instance, computing device 50 can be a workstation or endpoint in communication with server computing system(s) 60, with implementation of machine-learned models 65 being managed by server computing system(s) 60 to remotely perform inference (e.g., for runtime or training operations), with output(s) returned (e.g., cast, streamed, etc.) to computing device 50. Machine-learned models 65 can work cooperatively or interoperatively with machine-learned models 55 on computing device 50 to perform various tasks.

Model development platform system(s) 70 can include one or more processors 71 and a memory 72. Processor(s) 71 can be any suitable processing device (e.g., a processor core, a microprocessor, an ASIC, an FPGA, a controller, a microcontroller, etc.) and can be one processor or a plurality of processors that are operatively connected. Memory 72 can include one or more non-transitory computer-readable storage media, such as HBM, RAM, ROM, EEPROM, EPROM, flash memory devices, magnetic disks, etc., and combinations thereof. Memory 72 can store data 73 and instructions 74 which can be executed by processor(s) 71 to cause model development platform system(s) 70 to perform operations. The operations can implement any one or multiple features described herein. The operations can implement example methods and techniques described herein. Example operations include the functionality described herein with respect to model development platform 12. This and other functionality can be implemented by developer tool(s) 75.

Third-party system(s) 80 can include one or more processors 81 and a memory 82. Processor(s) 81 can be any suitable processing device (e.g., a processor core, a microprocessor, an ASIC, an FPGA, a controller, a microcontroller, etc.) and can be one processor or a plurality of processors that are operatively connected. Memory 82 can include one or more non-transitory computer-readable storage media, such as HBM, RAM, ROM, EEPROM, EPROM, flash memory devices, magnetic disks, etc., and combinations thereof. Memory 82 can store data 83 and instructions 84 which can be executed by processor(s) 81 to cause third-party system(s) 80 to perform operations. The operations can implement any one or multiple features described herein. The operations can implement example methods and techniques described herein. Example operations include the functionality described herein with respect to tools and other external resources called when training or performing inference with machine-learned model(s) 1, 4, 16, 20, 55, 65, etc. (e.g., third-party resource(s) 85).

FIG. 9 illustrates one example arrangement of computing systems that can be used to implement the present disclosure. Other computing system configurations can be used as well. For example, in some implementations, one or both of computing system 50 or server computing system(s) 60 can implement all or a portion of the operations of model development platform system 70. For example, computing system 50 or server computing system(s) 60 can implement developer tool(s) 75 (or extensions thereof) to develop, update/train, or refine machine-learned models 1, 4, 16, 20, 55, 65, etc. using one or more techniques described herein with respect to model alignment toolkit 17. In this manner, for instance, computing system 50 or server computing system(s) 60 can develop, update/train, or refine machine-learned models based on local datasets (e.g., for model personalization/customization, as permitted by user data preference selections).

Figure 10:
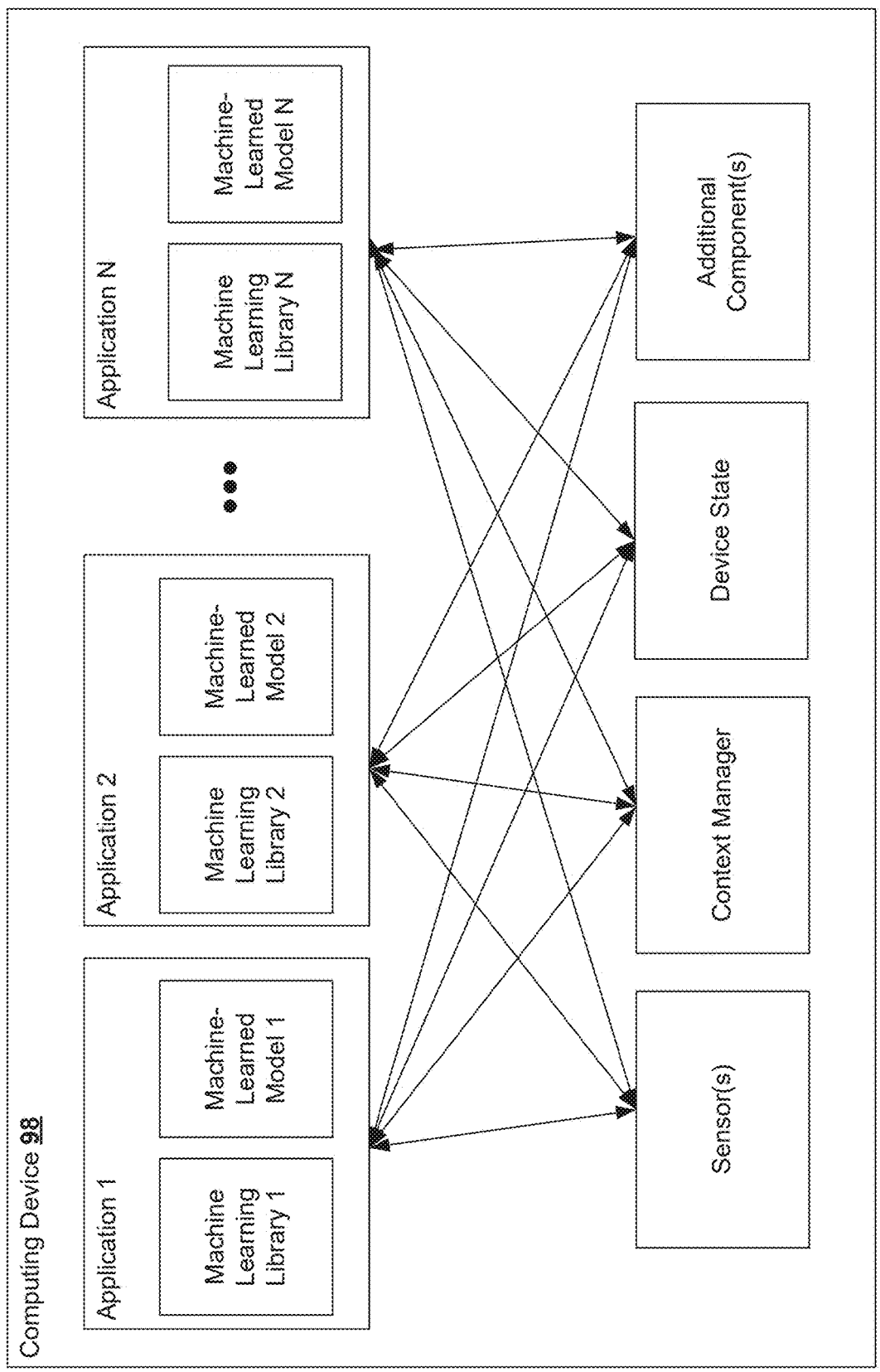
FIG. 10 is a block diagram of an example computing device according to example implementations of aspects of the present disclosure.

FIG. 10 is a block diagram of an example computing device 98 that performs according to example embodiments of the present disclosure. Computing device 98 can be a user computing device or a server computing device (e.g., computing device 50, server computing system(s) 60, etc.). Computing device 98 can implement model host 31. For instance, computing device 98 can include a number of applications (e.g., applications 1 through N). Each application can contain its own machine learning library and machine-learned model(s). For example, each application can include a machine-learned model. Example applications include a text messaging application, an email application, a dictation application, a virtual keyboard application, a browser application, etc. As illustrated in FIG. 10, each application can communicate with a number of other components of the computing device, such as, for example, one or more sensors, a context manager, a device state component, or additional components. In some implementations, each application can communicate with each device component using an API (e.g., a public API). In some implementations, the API used by each application is specific to that application.

Figure 11:
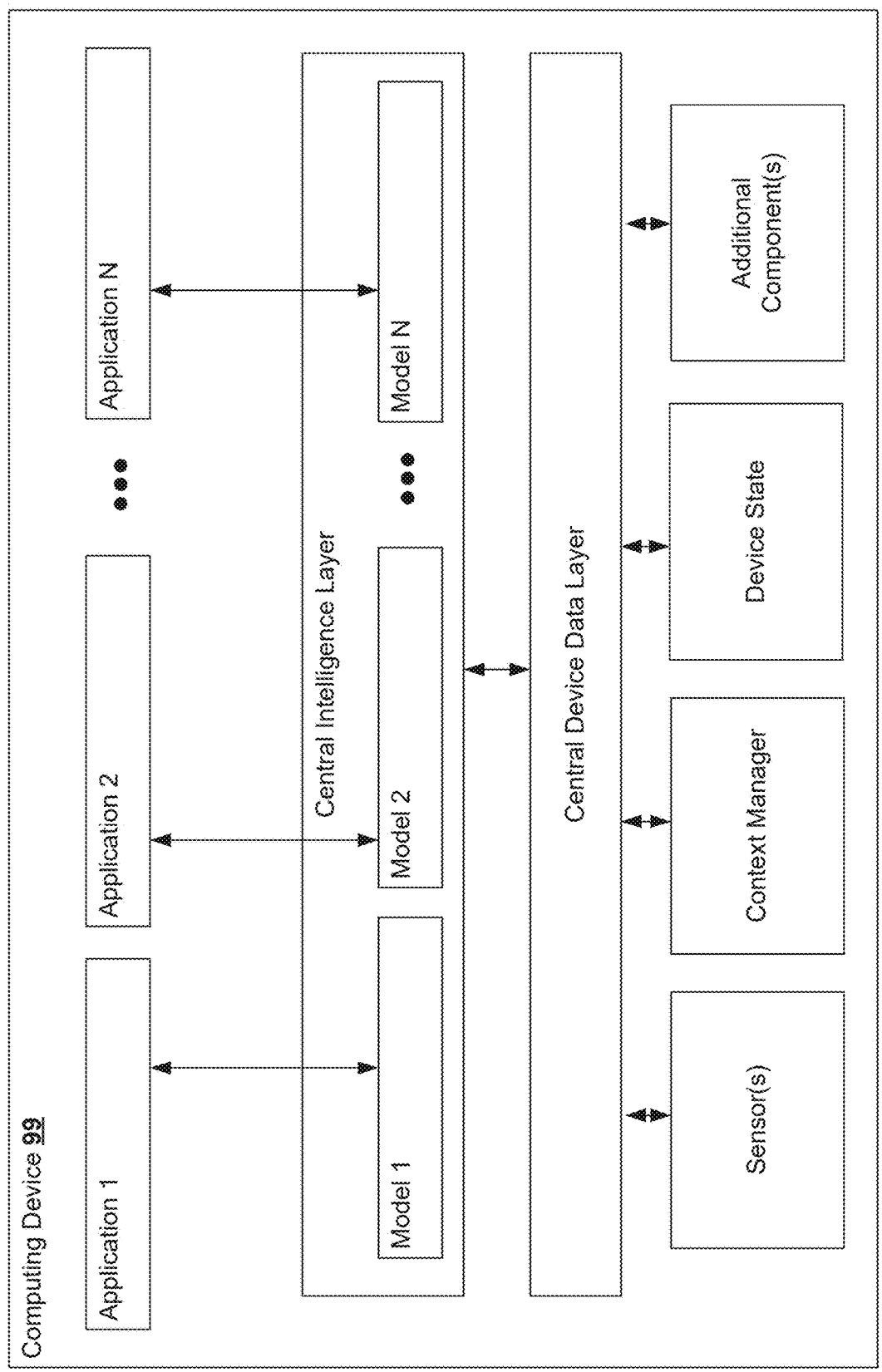
FIG. 11 is a block diagram of an example computing device according to example implementations of aspects of the present disclosure.

FIG. 11 is a block diagram of an example computing device 99 that performs according to example embodiments of the present disclosure. Computing device 99 can be the same as or different from computing device 98. Computing device 99 can be a user computing device or a server computing device (e.g., computing device 50, server computing system(s) 60, etc.). Computing device 98 can implement model host 31. For instance, computing device 99 can include a number of applications (e.g., applications 1 through N). Each application can be in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer can include a number of machine-learned models. For example, as illustrated in FIG. 11, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of computing device 99.

The central intelligence layer can communicate with a central device data layer. The central device data layer can be a centralized repository of data for computing device 99. As illustrated in FIG. 11, the central device data layer can communicate with a number of other components of the computing device, such as, for example, one or more sensors, a context manager, a device state component, or additional components. In some implementations, the central device data layer can communicate with each device component using an API (e.g., a private API).

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

Aspects of the disclosure have been described in terms of illustrative embodiments thereof. Any and all features in the following claims can be combined or rearranged in any way possible, including combinations of claims not explicitly enumerated in combination together, as the example claim dependencies listed herein should not be read as limiting the scope of possible combinations of features disclosed herein. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Clauses and other sequences of items joined by a particular conjunction such as "or," for example, can refer to "and/or," "at least one of", "any combination of" example elements listed therein, etc. Terms such as "based on" should be understood as "based at least in part on."

The term "can" should be understood as referring to a possibility of a feature in various implementations and not as prescribing an ability that is necessarily present in every implementation. For example, the phrase "X can perform Y" should be understood as indicating that, in various implementations, X has the potential to be configured to perform Y, and not as indicating that in every instance X must always be able to perform Y. It should be understood that, in various implementations, X might be unable to perform Y and remain within the scope of the present disclosure.

The term "may" should be understood as referring to a possibility of a feature in various implementations and not as prescribing an ability that is necessarily present in every implementation. For example, the phrase "X may perform Y" should be understood as indicating that, in various implementations, X has the potential to be configured to perform Y, and not as indicating that in every instance X must always be able to perform Y. It should be understood that, in various implementations, X might be unable to perform Y and remain within the scope of the present disclosure.

What is claimed is:

1. A method for distributed graph processing using atomic transactions, comprising:
   for each of a plurality of iterations:
      performing, by a computing system comprising one or more computing devices, for each node of a plurality of nodes of a first graph, one or more atomic transactions comprising:
         retrieving, from one or more distributed data structures that are distributed over a plurality of computing devices, neighbor data indicative of one or more neighbor nodes that are connected to the node by one or more edges of the first graph;
         retrieving, from the one or more distributed data structures based on the neighbor data, cluster data indicative of one or more clusters associated with the one or more neighbor nodes; and
         writing, to the one or more distributed data structures based on the neighbor data and the cluster data, cluster assignment data assigning the node to at least one cluster.

2. The method of claim 1, wherein the one or more distributed data structures are stored in a distributed volatile memory system distributed in volatile memory of the plurality of computing devices.

3. The method of claim 1, wherein the one or more atomic transactions comprise one or more atomic remote direct memory access transactions.

4. The method of claim 1, wherein the computing system comprises a plurality of worker computing devices operating in parallel, and wherein each worker computing device of the plurality of worker computing devices performs at least one atomic transaction for at least one node of the plurality of nodes.

5. The method of claim 4, wherein the computing system further comprises one or more controller computing devices, and further comprising:
receiving, by a first worker computing device from the one or more controller computing devices, node assignment data indicative of a first node assigned to the first worker computing device; and
performing, by the first worker computing device responsive to receiving the node assignment data, a first atomic transaction on the first node assigned to the first worker computing device.

6. The method of claim 5, further comprising:
receiving, by the one or more controller computing devices, data indicative of data loss during one or more iterations of the plurality of iterations; and
assigning, by the one or more controller computing devices based on the data indicative of the data loss, one or more repeat work assignments associated with the one or more iterations.

7. The method of claim 4, wherein the one or more atomic transactions comprise a plurality of read or write operations performed by a first worker computing device on a first plurality of data regions, and wherein the one or more atomic transactions are configured to prevent the first worker computing device from writing data if any region of the first plurality of data regions has been written to by a second worker computing device during the atomic transaction.

8. The method of claim 7, wherein the one or more distributed data structures comprise a plurality of fixed-size data blocks, and wherein each data region of the first plurality of data regions comprises one or more fixed-size data blocks of the plurality of fixed-size data blocks.

9. The method of claim 1, wherein the cluster assignment data is determined based on one or more modularity values.

10. The method of claim 9, wherein determining the cluster assignment data comprises:
obtaining, for each cluster of a plurality of clusters, a first modularity value for the cluster with the node included in the cluster;
obtaining, for each cluster of the plurality of clusters, a second modularity value for the cluster with the node excluded from the cluster; and
selecting, based on one or more comparisons between first modularity values and second modularity values, a cluster assignment for the node.

11. The method of claim 10, wherein writing the cluster assignment data comprises:
writing, to a distributed data structure storing node data, a cluster identifier to a data record associated with the node; and
if the at least one cluster comprises two or more nodes including the node, writing cluster data associated with the at least one cluster to a distributed data structure storing cluster data, the cluster data comprising size data indicative of a number of nodes in the cluster and edge data indicative of one or more edges from the cluster to one or more nodes or other clusters;
wherein the cluster identifier is a specially designated identifier for singleton clusters if the at least one cluster consists of only the node.

12. The method of claim 1, further comprising, for each of the plurality of iterations:
writing, by the computing system subsequent to performing an atomic transaction for each of the one or more nodes, to the one or more distributed data structures, data indicative of an updated graph comprising at least one of:
a collapsed graph, wherein each node of the collapsed graph corresponds to a cluster of the first graph; and
an expanded graph, wherein each cluster of the expanded graph corresponds to a node of the first graph.

13. The method of claim 12, wherein the plurality of iterations comprises:
a first plurality of iterations wherein the updated graph comprises a collapsed graph; and
a second, subsequent plurality of iterations wherein the updated graph comprises an expanded graph.

14. The method of claim 1, wherein each of the plurality of iterations comprises performing, for each node, a plurality of atomic transactions.

15. The method of claim 1, wherein the cluster data comprises data indicative of a plurality of edges connected to member nodes of the one or more clusters.

16. The method of claim 1, wherein the one or more distributed data structures comprise a plurality of copies of the neighbor data, cluster data, and node assignment data, and wherein writing the cluster assignment data comprises:
writing, to a plurality of data locations associated with the plurality of copies, the cluster assignment data.

17. A computing system comprising one or more processors and one or more non-transitory computer-readable media storing instructions that are executable by the one or more processors to cause the computing system to perform operations, the operations comprising:
for each of a plurality of iterations:
performing, for each node of a plurality of nodes of a first graph, one or more atomic transactions comprising:
retrieving, from one or more distributed data structures that are distributed over a plurality of computing devices, neighbor data indicative of one or more neighbor nodes that are connected to the node by one or more edges of the first graph;
retrieving, from the one or more distributed data structures based on the neighbor data, cluster data indicative of one or more clusters associated with the one or more neighbor nodes; and
writing, to the one or more distributed data structures based on the neighbor data and the cluster data, cluster assignment data assigning the node to at least one cluster.

18. The computing system of claim 17, wherein the one or more atomic transactions comprise one or more atomic remote direct memory access transactions.

19. The computing system of claim 17, further comprising a plurality of worker computing devices operating in parallel, and wherein the operations comprise performing, by each worker computing device of the plurality of worker computing devices, at least one atomic transaction for at least one node of the plurality of nodes.

20. One or more non-transitory computer-readable media storing instructions that are executable by a computing system to perform operations, the operations comprising:
for each of a plurality of iterations:
performing, for each node of a plurality of nodes of a first graph, one or more atomic transactions comprising:
retrieving, from one or more distributed data structures that are distributed over a plurality of computing devices, neighbor data indicative of one or more neighbor nodes that are connected to the node by one or more edges of the first graph;

retrieving, from the one or more distributed data structures based on the neighbor data, cluster data indicative of one or more clusters associated with the one or more neighbor nodes; and writing, to the one or more distributed data structures based on the neighbor data and the cluster data, cluster assignment data assigning the node to at least one cluster.

* * * * *